United States Patent
Kawasaki

(10) Patent No.: US 7,602,560 B2
(45) Date of Patent: Oct. 13, 2009

(54) IMAGE PICKUP LENS, IMAGE PICKUP APPARATUS AND MOBILE TERMINAL

(75) Inventor: Takashi Kawasaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 70 days.

(21) Appl. No.: 12/019,412

(22) Filed: Jan. 24, 2008

(65) Prior Publication Data
US 2008/0180814 A1  Jul. 31, 2008

(30) Foreign Application Priority Data
Jan. 29, 2007 (JP) .............................. 2007-017637

(51) Int. Cl.
  G02B 9/14 (2006.01)
  G02B 9/12 (2006.01)
  G02B 7/02 (2006.01)
(52) U.S. Cl. ................... 359/785; 359/784; 359/811
(58) Field of Classification Search ............... 359/784, 359/785, 811
  See application file for complete search history.

(56) References Cited

U.S. PATENT DOCUMENTS 7,035,023 B2 * 4/2006 Nanba et al. ............... 359/785
2008/0239138 A1 * 10/2008 Sano ........................... 348/340

FOREIGN PATENT DOCUMENTS

JP 2005-308800 11/2005
JP 2006-133270 5/2006

* cited by examiner

Primary Examiner—David N Spector
(74) Attorney, Agent, or Firm—Finnegan, Henderson, Farabow, Garrett & Dunner, L.L.P.

(57) ABSTRACT

The present invention provides an image pickup lens for forming an image of an object on a photoelectrical converter of a solid-state image pickup element. The image pickup lens includes: an aperture stop; a first lens having a positive refractive power and having a meniscus shape whose surface facing the object side is convex; a second lens having a negative refractive power whose surface facing an image side of the image pickup lens is concave; and a third lens having a positive refractive power and having a meniscus shape whose surface facing the object side is convex. Each of the first lens, the second lens, and the third lens includes an aspheric optical surface. The image pickup lens satisfies predetermined conditions according to a focal length of the first lens, and a refractive power of an air lens formed from surfaces of the second lens and the third lens.

7 Claims, 19 Drawing Sheets

MERIDIONAL COMA (mm)

IMAGE PICKUP LENS, IMAGE PICKUP APPARATUS AND MOBILE TERMINAL

This application is based on Japanese Patent Application No. 2007-017637 filed on Jan. 29, 2007, in Japanese Patent Office, the entire content of which is hereby incorporated by reference.

TECHNICAL FIELD

The present invention relates to an image pickup lens suitable for a small-sized image pickup apparatus employing a solid-state image pickup element; and to a mobile terminal equipped with the image pickup lens.

BACKGROUND

In recent years, cell-phones and mobile terminals each being equipped with an image pickup apparatus are in widespread use, which results from higher performance and downsizing of an image pickup apparatus employing a solid-state image pickup element such as a CCD (Charge Coupled Device) type image sensor or a CMOS (Complementary Metal Oxide Semiconductor) type image sensor. Further, for the image pickup lens mounted on these image pickup apparatuses (each being called a camera module), there are increasing demands for further higher performance in addition to further downsizing, because the solid-state image pickup element includes the larger number of pixels. As an image pickup lens for this application, there has been suggested an image pickup lens of a three-element structure type because it has advantages that higher performance can be achieved and downsizing is not interrupted, compared with a lens of a single-element type or of a two-element type.

As this image pickup lens of a three-element structure type, there is known the so-called triplet type image pickup lens that is composed of a positive first lens in a meniscus shape whose convex surface faces an object, a negative second lens in a meniscus shape whose concave surface faces an object and a third lens having positive refractive power, in the order from the object, as disclosed in, for example, Patent Document 1: Japanese Patent Publication Open to Public Inspection (JP-A) No. 2006-133270.

Further, there is known an image pickup lens aiming downsizing of the total length (a distance on an optical axis from the lens surface closest to the object side in the total image pickup system to the image-side focal point) that is composed of a positive first lens whose convex surface faces an object, a negative second lens whose convex surface faces an object and a positive third lens whose convex surface faces an object, in the order from the object as disclosed in, for example, Patent Document 2: JP-A No. 2005-308800.

SUMMARY

However, the negative second lens in a meniscus shape whose concave stir face faces an object is used in the image pickup lens described in the aforesaid Patent Document 1. Due to this, a peripheral portion of the second lens is protruded toward an object. In order to prevent the second lens from interfering with the first lens, and to secure a sufficient lens thickness at an effective diameter of the second lens, it requires securing a distance between the first lens and the second lens to be great. Further, the convex, surface of the second lens faces toward an image side and the convex surface of the third lens faces toward an object side. Therefore, the second lens and the third lens need to be away from each other sufficiently at their peripheries in order to prevent these lenses from interfering with each other on the optical axis. As a result, a peripheral portion of the third lens protrudes toward an image side greatly. In order to avoid the third lens contacting with a base board, it is hard to provide a small focal distance, resulting in leaving room for further improvement for downsizing.

Further, the image pickup lens described in the aforesaid Patent Document 2 has a problem that a value of a smallest f-number (for f-number for full aperture) is small and aberration correction is insufficient. If the total length of the lens is shortened, performance of the lens is deteriorated. Accordingly, the lens has a difficulty to be used with an image pickup element having a greater number of pixels.

In view of the aforesaid problems, the present invention provides an image pickup lens in a three-element structure in which a sufficient lens thickness at an effective diameter can be secured and various aberrations can be corrected properly in spite of the size that is smaller than that of a conventional lens.

A structures relating to the present invention is an image pickup lens for forming an image of an object on a photoelectrical converter of a solid-state image pickup element. The image pickup lens comprises, in order from an object side thereof: an aperture stop; a first lens having a positive refractive power and having a meniscus shape whose surface facing the object side is convex; a second lens having a negative refractive power whose surface facing an image side of the image pickup lens is concave; and a third lens having a positive refractive power and having a meniscus shape whose surface facing the object side is convex. Each of the first lens, the second lens, and the third lens comprises an aspheric optical surface. Further, a focal length of the first lens and a refractive power of an air lens which is formed from the surface of the second lens facing the image side and the surface of the third lens facing the object side satisfy the predetermined conditions.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
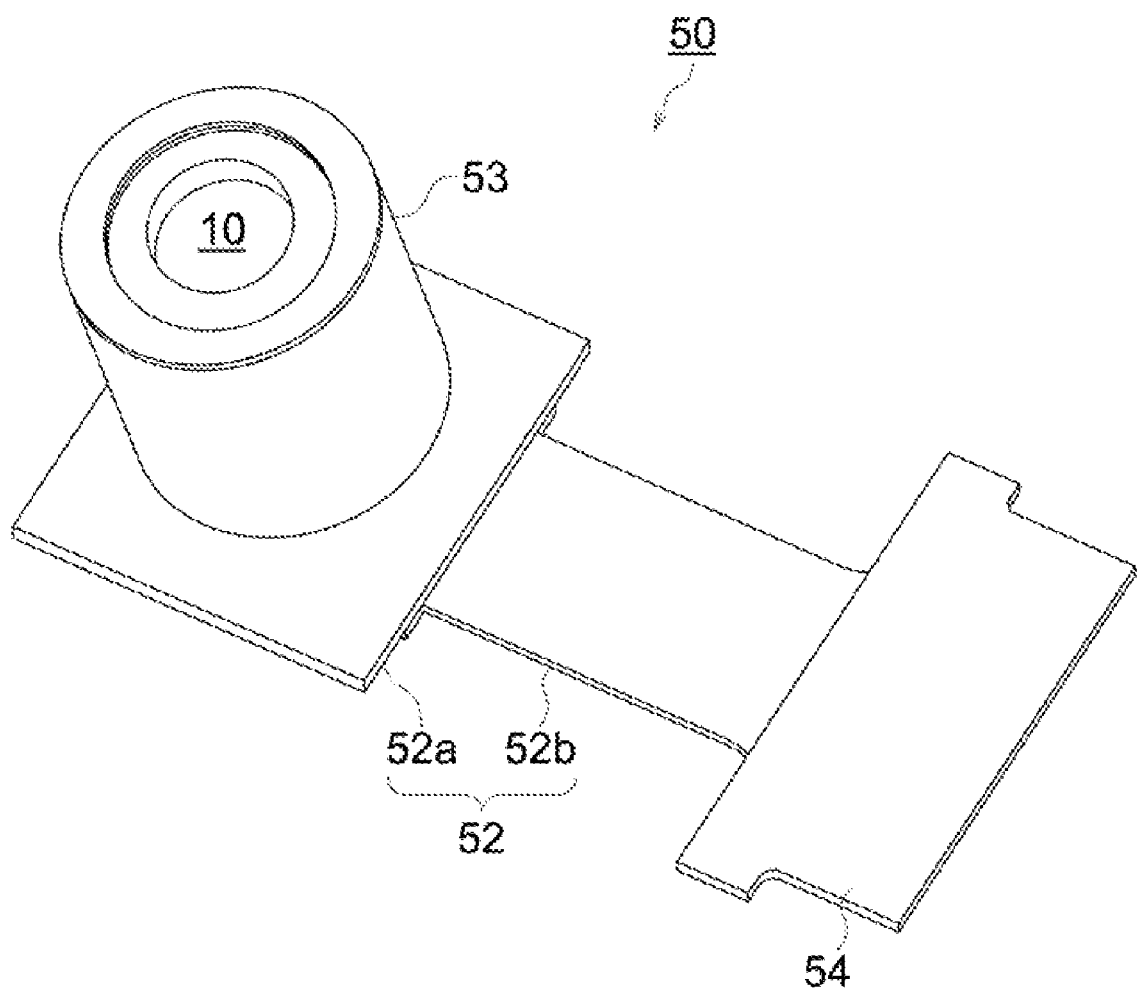
FIG. 1 is a perspective view of an image pickup apparatus relating to the present embodiment.

The invention will be explained in detail as follows, referring to the embodiment to which, however, the invention is not limited.

A preferred embodiment of the invention is an image pickup lens for forming an image of an object on a photoelectrical converter of an solid-state image pickup element. The image pickup lens comprises, in order from an object side thereof; an aperture stop; a first lens having a positive refractive power and having a meniscus shape whose surface facing the object side is convex; a second lens having a negative refractive power whose surface facing an image side of the image pickup lens is concave; and a third lens having a positive refractive power and having a meniscus shape whose surface facing the object side is convex. Each of the first lens, the second lens, and the third lens comprises an aspheric optical surface. The image pickup lens satisfies following expressions.

$$0 < Pair/P < 1.0 \quad (1)$$

$$0.7 < f1/f < 1.25 \quad (2)$$

Where, f is a focal length of the total system of the image pickup lens, f1 is a focal length of the first lens, P is a refractive power of a total system of the image pickup lens, and Pair is a refractive power of an air lens which is formed from the surface of the second lens facing the image side and the surface of the third lens facing the object side. The refractive power Pair is defined by a following expression (7).

$$Pair = \frac{1-n2}{R4} + \frac{n3-1}{R5} - D23 \cdot \frac{(1-n2) \cdot (n3-1)}{R4 \cdot R5}, \quad (7)$$

Where, n2 is a refractive index of the second lens for d line, n3 is a refractive index of the third lens for d line, R4 is a curvature radius of the surface of the second lens facing the image side, R5 is a curvature radius of the surface of the third lens facing the object side, and D23 is a length of an air space between the second lens and the third lens along an optical axis of the image pickup lens.

The above image pickup lens preferably satisfies a following expression (3).

$$0 < (R3+R4)/(R3-R4) < 3.0 \quad (3)$$

Where, R3 is a curvature radius of a surface of the second lens facing the object side, and R4 is a curvature radius of the surface of the second lens facing the image side.

The above image pickup lens preferably satisfies a following expression (4).

$$1.3 < f3/f < 4.0 \quad (4)$$

Where, f3 is a focal length of the third lens and f is a focal length of the total system of the image pickup lens.

The above image pickup lens preferably satisfies a following expression (5).

$$20 < v1-v2 < 65 \quad (5)$$

Where, v1 is an Abbe number of the first lens, and v2 is an Abbe number of the second lens.

In the above image pickup lens, each of the first lens, the second lens, and the third lens may comprise a glass material.

Another embodiment of the present invention is an image pickup apparatus comprising; a solid-state image pickup element; any one of the above image pickup lenses; a casing comprising a light-shielding material. The casing comprises an opening for an incident light flux from an object side of the image pickup lens and houses the image pickup lens therein. The solid-state image pickup element, the image pickup lens, and the casing are formed in one body. The image pickup apparatus has a height of 10 mm or less in a direction of an optical axis of the image pickup lens.

Another embodiment of the present invention is an mobile terminal comprising the above image pickup apparatus.

Since the present invention provides a structure including, in order from the object side: an aperture stop; a first lens having a positive refractive power and having a meniscus shape whose surface facing the object side is convex; a second lens having a negative refractive power whose surface facing an image side of the image pickup lens is concave; and a third lens having a positive refractive power and a meniscus shape whose surface facing the object side is convex, various aberrations can be corrected properly. In addition, since a concave surface faces the image side in the second lens, it is possible for the second lens to make a distance on an optical axis between itself and the third lens to be small, without being away from the third lens whose convex surface faces the object side at the peripheral portion.

In addition, by arranging an aperture stop to be closest to the object side, it is possible to arrange a position of an exit pupil to be farther from an image pickup plane, and thereby to make an incident angle of a principal ray of a light flux that forms an image on a peripheral portion of the image pickup plane of a solid-state image pickup element (an angle formed between the principal ray and an optical axis) to be small to secure the so-called telecentricity. Further, even when a mechanical shutter is needed, it can be arranged to be closest to the object side, and an image pickup lens whose total length is short can be obtained.

Conditional expression (1) represents conditions to cause aberration correction to be excellent, and to cause lens formation to be advantageous, by making refractive power of an air lens formed between the second lens and the third lens to be appropriate. When a value of the conditional expression (1) is greater than the lower limit thereof, the air lens formed by the second lens and the third lens has positive refractive power, and a radius of curvature of the surface of the second lens on the image side can be made greater than that of the surface of the third lens on the object side. As a result, even when a distance between the second lens and the third lens on the optical axis is made small, it is possible to secure an appropriate distance on the peripheral portion, and to secure a sufficient lens thickness of each of the second lens and the third lens at an effective diameter, which is advantageous for forming a lens. On the other hand, when a value of the conditional expression (1) is smaller than the upper limit thereof, positive refractive power of the air lens can be controlled to be appropriate, whereby, Petzval's sum does not grow to be too great, and an image plane can be made to be flat.

Further, the following range is more preferable.

$$0.2 < Pair/P < 0.8 \tag{1'}$$

Conditional expression (2) represents conditions to shorten the total lens length by setting a focal distance of the first lens to be appropriated. When a value of the conditional expression (2) is greater than the lower limit thereof, power of the first lens does not grow to he too strong and occurrence of various aberrations can be controlled. On the other hand, when a value of the conditional expression (2) is smaller than the upper limit thereof, it is possible to keep the power of the first lens to be appropriate, and thereby to allow a position of a principal point to approach the object side, whereby, a focal length can be made long, which is advantageous for shortening the total length of the lens.

Further, the following range is more preferable.

$$0.75 < f1/f < 1.20 \tag{2'}$$

Conditional expression (3) represents conditions for setting a form of the second lens to be appropriate. In the range shown in the Conditional expression (3), the second lens changes from its biconcave form wherein a radius of curvature on the object side is equal to that on the image side to a meniscus form having negative refractive power wherein a convex surface faces the object side. Though the peripheral portion of the second lens is protruded toward the third lens side in this case, it is possible to reduce a distance on an optical axis between the second lens and the third lens, while preventing the second lens and the third lens from, interference on a peripheral portion of the lenses caused by the protrusion of the peripheral portion of the second, lens toward the third lens, when the upper limit of the conditional expression is not exceeded. On the other hand, when the lower limit of the conditional expression is exceeded, it is possible to reduce a distance on an optical axis between the first lens and the second lens, while preventing the first lens and the second from interference on a peripheral portion of the lenses caused by the protrusion of the peripheral portion of the second lens on the object side toward the first lens side, and a lens thickness at an effective diameter for each of the first lens and the second lens can be secured sufficiently.

Further, the following range is more preferable.

$$0.3 < (R3+R4)/(R3-R4) < 2.7 \tag{3'}$$

Conditional expression (4) represents conditions for setting a focal length of the third lens to be appropriate. When the conditional expression (4) is greater the lower limit thereof, refractive power of the third lens does not grow to be greater beyond necessity, spherical aberration and coma each being of a high order generated on the third lens can be controlled to be small, and an appropriate back focus can be secured so that the third lens may not touch a base board. On the other hand, when the conditional expression (4) is smaller than the upper limit thereof, refractive power of the third lens can be kept to be appropriate, a back focus can be made to be short, and the total length of the lens can be shortened. Further, the following range is more preferable.

$$1.4 < f3/f < 3.8 \tag{4'}$$

Conditional expression (5) represents conditions for correcting chromatic aberration of the whole system of the image pickup lens. When the conditional expression (5) is larger than the lower limit thereof, axial chromatic aberration and magnification chromatic aberration can be corrected in a balanced manner. On the other hand, when the conditional expression (5) is smaller than the upper limit thereof, easily-available materials can be used for lenses. Further, the following range is more preferable.

$$25 < v1 - v2 < 65 \tag{5'}$$

Further, for the purpose of downsizing of an image pickup apparatus as a whole, there has been developed recently a solid-state image pickup element having a smaller pixel pitch despite the same number of pixels, resulting in a smaller size of an image pickup surface. An image pickup lens for the solid-state image pickup element having a smaller size of an image pickup surface of this kind, is required to have a relatively short focal length of the total system.

Therefore, when all of the first lens-third lens are made of glass which is a material with higher refractive index and lower dispersion than those of plastic, it is possible to control chromatic aberration to be small, while keeping the focal length of the total lens system to be short. Further, by using glass material which hardly has refractive index changes caused by temperature changes for forming a lens, it is possible to make positional fluctuation of an image point of the total system of the image pickup lens caused by temperature changes to be small.

By forming the first lens with glass materials, it is possible to prevent the first lens from a problem such as cracks, because it is possible to constitute without causing a plastic lens to be exposed to the outside.

Further, in recent years, a unit of a camera module having sufficient heat resistance is requested so that it may resist reflow, because it is possible to enhance work efficiency if automatic mounting with a reflow process is employed for the soldering for connecting an external terminal of a camera module to another circuit board. Under this situation, the glass material has an effect that it can be used also for a camera module using reflow process, because the glass material has sufficient heat resistance that can resist against reflow.

Incidentally, in the present specification, the expressions of "made of glass material" and "comprise glass material" also include an embodiment in which the glass material is used as a base material and coating process is conducted on the surface of the base material for the purpose of preventing reflection and of enhancing surface hardness.

Further, by using an image pickup lens relating to the invention, a high-performance image pickup apparatus which is further smaller in size can be obtained.

Incidentally, it is assumed that "the image pickup apparatus has a height of 10 mm or less in a direction of an optical axis" means a total length of an image pickup apparatus equipped with all of the aforesaid structures in the optical axis direction. Therefore, for example, when a casing is provided on the surface of a base board, and electronic parts are mounted on the back surface of the base board, a distance from the tip portion of the casing closer to the object side to the tip portion of the electronic parts protruded on the back surface is less than 10 mm. Further, "an opening for an incident light flux" does not always means an air space such as a hole, but it also means a portion on which an area that can transmit incident light coming from the object side is formed.

Further, by using the image pickup apparatus of the invention, a high-performance mobile terminal which is further smaller in size can be obtained.

Herein, with respect to a measure of a small-sized image pickup lens, embodiments of the invention are provided with aimed at downsizing at the level to satisfy the following expression (6). By satisfying the following range, the total length of the image pickup lens can be shortened, and an outside diameter of the lens can also be made smaller synergistically. Owing to this, it is possible to attain downsizing and weight reduction of the total image pickup apparatus.

$$L/f<1.30 \qquad (6)$$

In the expression, L represents a distance from a lens surface closest to the object side in the total system of image pickup lens to the focus on the image side, and f represents a focal length of the total system of an image pickup lens.

Herein, the focus on the image side means an image point formed when parallel light that is in parallel with an optical axis enters the image pickup lens. Meanwhile, when a parallel flat plate such as an optical lowpass filter, an infrared blocking filter and a seal glass of an image pickup element is arranged between the surface closest to the image side in the image pickup lens and the focus position on the image side, a value of the aforesaid L is to be calculated under the condition that a parallel flat plate portion is made to be an air-conversion distance.

Further, the structure more preferably satisfies the following conditional expression.

$$L/f<1.20 \qquad (6)'$$

Figure 2:
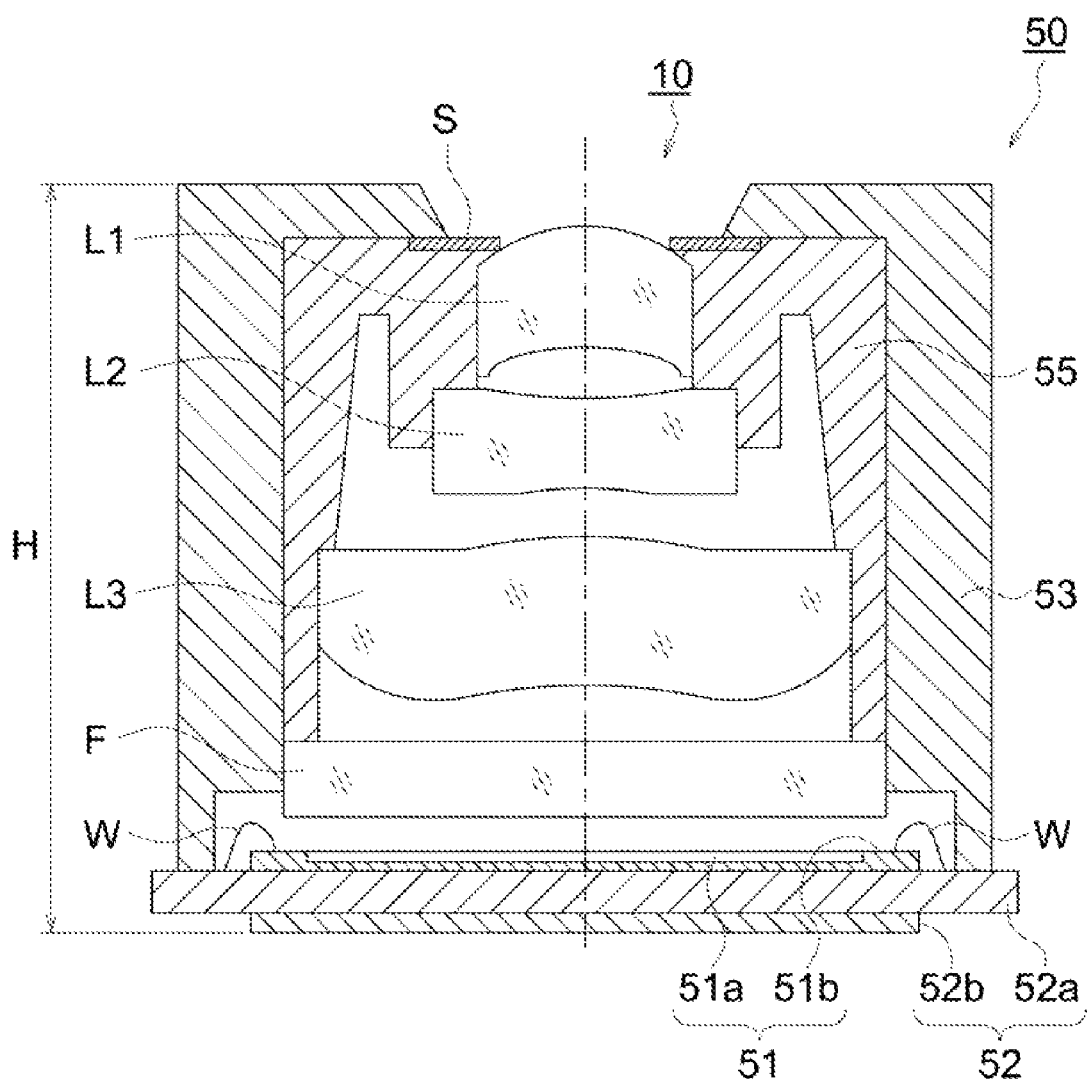
FIG. 2 is a diagram showing a section along an optical axis of an image pickup lens of an image pickup apparatus relating to the present embodiment.

FIG. 1 is a perspective view of an image pickup apparatus 50 according to the present embodiments. FIG. 2 is a view typically showing the section along the optical axis of the image pickup lens of the image pickup apparatus 50 according to the present embodiments.

As shown in FIG. 1 or FIG. 2, the image pickup apparatus 50 is provided with; a CMOS type image pickup element 51; the image pickup lens 10; a casing 53; supporting base board 52a; and a flexible print base board 52b. They are integrally formed in one body. The CMOS type image pickup element 51 is provided as the solid-state image pickup element and includes the photoelectric conversion section 51a. The image pickup lens 10 is provided for taking the object image to the photoelectric conversion section 51a of this image pickup element 51. The casing 53 is provided as a lens frame formed of the light-shielding member and includes the opening section for the incident light from the object side of the image pickup lens. The supporting base board 52a supports the image pickup element 51. The flexible print base board 52b includes the terminal for the external connection (called also the external connecting terminal) 54 sending and receiving the electric signal.

As shown in FIG. 2, in the image pickup element 51, the photoelectric conversion section 51a as the light receiving section in which the pixels (the photoelectric conversion element) are 2-dimensionally arranged at the central part of the surface on the light receiving side, is formed. On the periphery of the photoelectric conversion section 51a, the signal processing circuit 51b is formed. This signal processing circuit 51b is structured by: the drive circuit section which successively drives each pixel and obtains the signal charge; the A/D conversion section which converts each signal charge into the digital signal; and the signal processing section which forms the image signal output by using this digital signal.

In the vicinity of the outer edge of the surface on the light receiving side of the image pickup element 51, many pads, not shown, are provided, and connected to the support base board 52a through the bonding wire W. Hereupon, the image pickup element is not limited to the above-described CMOS type image sensor, but may be the element in which the other element such as CCD is applied.

The base board 52 is structured by a hard support base board 52a and a flexible print base board 52b. The hard support base board supports the image pickup element 51 and the casing 53 by its one surface. One end of the flexible print base board 52b is connected to the other surface (the surface opposed to the image pickup element 51) of the support base board 52a. On the support base board 52a, many signal transmission pads are provided on the both surfaces of the front and rear surfaces. On the one surface, it is connected to the image pickup element 51 through a bonding wire W, and on the other surface, it is connected to the flexible print base board 52b.

In the flexible print base board 52b, as shown in FIG. 1, one end part is connected to the support, base board 52a. It allows that the support base board 52a and an external circuit (for example, a control circuit provided by the higher level of apparatus in which the image pickup apparatus is installed) are connected through the external connecting terminal 54 provided on the other end part. It also allows that the voltage for driving the image pickup element 51 or the clock signal from the external circuit is supplied to the flexible print base board 52b and that outputs the digital YUV signal is outputted to the external circuit. Furthermore, the flexible print base board 52 has the flexibility. Thereby, the intermediate part of the flexible print base board 52 is deformed, and it gives the support base board 52a the degree of its freedom to the orientation or the arrangement of the external connecting terminal 54.

As shown in FIG. 2, the casing 53 is fixedly arranged on a surface of the support base board 52a which is a surface facing the image pickup element 51 so as to cover the image pickup element 51. That is, one side of the casing S3 facing the image pickup element 51 has a widely opened shape so as to surround the image pickup element 51 and is contacted and fixed to the support base board 52a. The other side of the casing 53 is formed in a cylindrical shape having a flange with a small opening.

Inside of the casing 53, an infrared ray cut filter F is fixedly arranged between the image pickup lens 10 and the image pickup element 51.

Image pickup lens 10 is composed of aperture stop S, first lens L1, second lens L2 and third lens L3, and it is structured so that an object image may be formed on photoelectric conversion surface 51a of image pickup element 51. The first lens L1 is a meniscus-formed lens that has a convex surface facing an object and has positive refractive power. The second lens L2 is a lens that has a concave surface facing an image said has negative refractive power. The third lens L3 is a meniscus-formed lens that has a convex surface facing an object and has positive refractive power. Each of the first lens L1, the second lens L2 and the third lens L3 has at least a surface at one side formed to be in an aspheric form. Incidentally, each one-dot chain line in FIG. 2 represents an optical axis for each of the lens L1-lens L3.

Respective lenses L1-L3 constituting image pickup lens 10 are held on lens frame 55. Casing 53 houses therein the lens frame 55 and image pickup lens 10 held by the lens frame 55, and the lens frame 55 fits in the easing 53 through an outer circumference of the lens frame 55 to hit a flange portion having small openings of the casing 53 to be positioned.

Incidentally, when connecting image pickup apparatus 50 to another circuit base board, terminal for connecting with an outside (which is also called outside connection terminal) 54 and flexible print base board 52b are not needed. Further, casing 53 and lens frame 55 are made of materials having heat resistance that resists against reflow process.

In the image pickup apparatus shown in FIG. 2, a height of the image pickup apparatus in the direction of the optical axis of the image pickup lens is represented by illustrated H.

It is further possible to arrange a fixed diaphragm that blocks unwanted light between respective lenses L1-L3. In particular, it is preferable to arrange the fixed diaphragm between the third lens and optical filter F. It is further possible to arrange a rectangular fixed diaphragm outside an optical path because it can control generation of ghost and flare.

Figure 3:
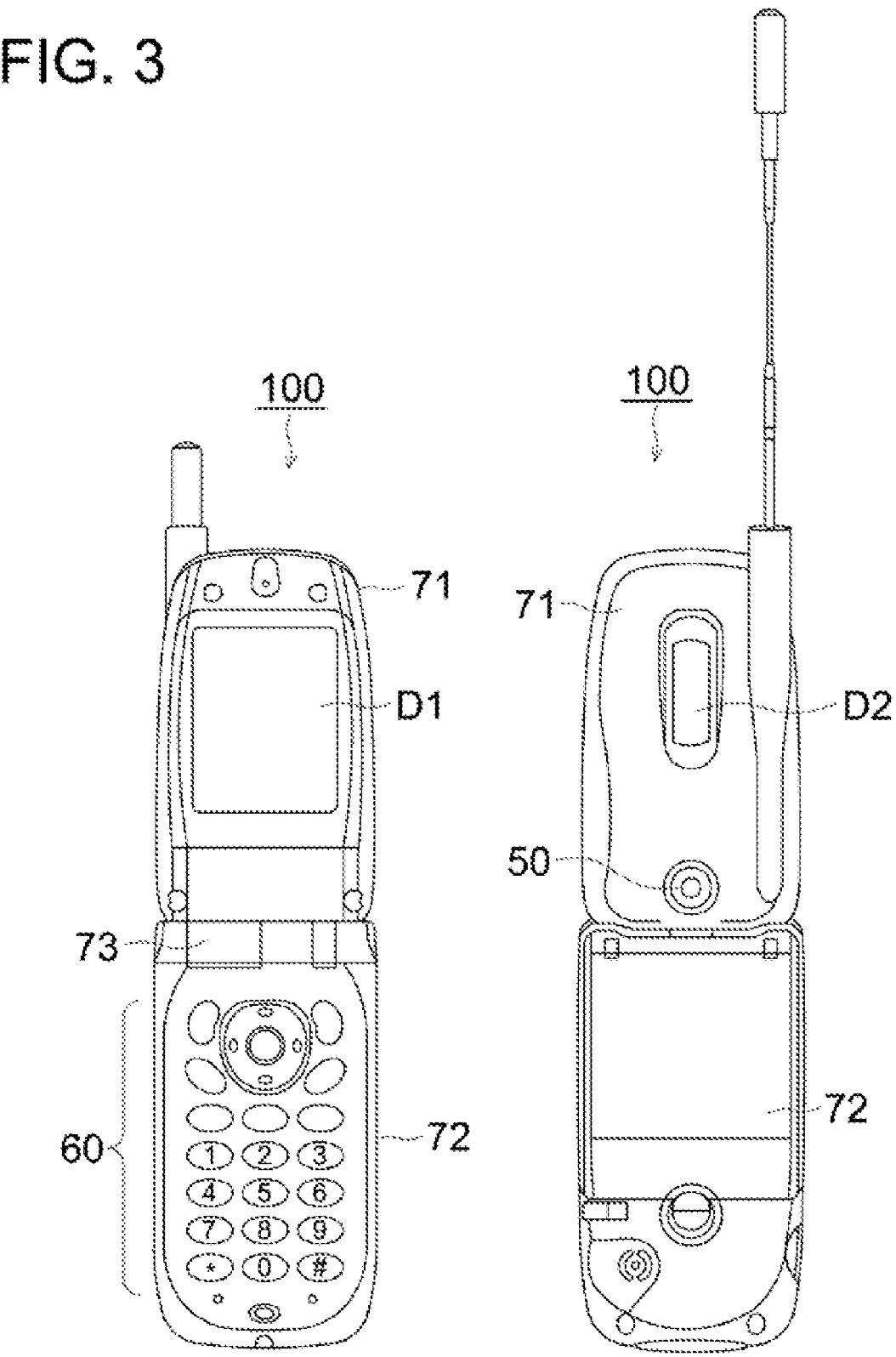
FIG. 3 is an appearance diagram of a cell-phone that is an example of a mobile terminal equipped with an image pickup apparatus relating to the present embodiment.

FIG. 3 is an appearance view of a mobile phone 100 which is an example of a mobile terminal provided with the image pickup apparatus 50 of the present embodiment.

In the mobile phone 100 shown in FIG. 3, an upper casing 71 as a case provided with the display image screens D1 and D2, and the lower casing 72 provided with operation buttons 60 which is an input section, are connected with each other through a hinge 73. The image pickup apparatus 50 is housed below the display image screen D2 in the upper casing 71, and the image pickup apparatus 50 is arranged in such a manner that the light can be taken-in from the outer surface side of the upper casing 71.

Hereupon, this image pickup apparatus may also be arranged above or on the side surface of the display image screen D2 in the upper casing 71. Further, it is of cause that the mobile phone is not limited to a folding type.

Figure 4:
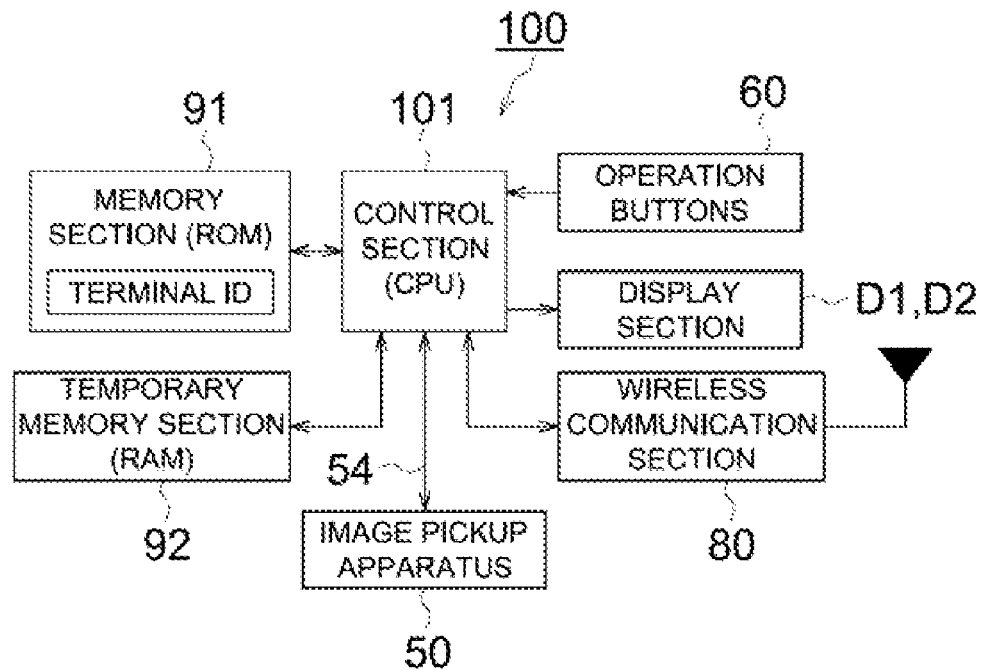
FIG. 4 is a control block diagram of a cell-phone.

FIG. 4 is a block diagram of the mobile phone 100.

As shown in FIG. 4, the external connecting terminal 54 of the image pickup apparatus 50 is connected to the control section 101 of the mobile phone 100, and the image signal such as the brightness signal or the color difference signal is outputted to the control section 101.

On the one hand, the mobile phone 100 is provided with: a control section (CPU) 101 which generally controls each section and executes the program corresponding to each processing, operation buttons 60 which is an input section for indicating-inputting the number, the display image screen D1 and D2 for displaying the predetermined data display or image picked-up image, a wireless communication section 80 for realizing an each kind of information communication to the external server, a memory section (ROM) 91 which stores the data necessary for the system program of the mobile phone 100 or each kind of processing program or terminal ID, and a temporary memory section (RAM) 92 which temporarily stores each kind of processing program or data or processing data processed by the control section 101, the image data by the image pickup apparatus 50, or is used as a working area.

Further, the image signal inputted from the image pickup apparatus 50 is stored in the memory section 91 by the control section 101 of the mobile phone 100, is displayed on the display image planes D1 or D2, and further is transmitted to the outside as the image information through the wireless communication section 80.

EXAMPLES

Examples of the image pickup lens applied to the above embodiment will be shown below. Symbols used in each example are as follows:

f: focal length of the total system of the image pickup lens

FB: back focus

F: F number

2Y: diagonal line length of an image pickup surface of the solid-state image pickup element R: curvature radius of a refractive surface D: distance between stir faces along the optical axis Nd: refractive index of the lens material for d-line vd: Abbe's number of the lens material In each Example, the shape of the aspheric surface is expressed by the following expression (8) in which the top of the surface is on the origin, x-axis extends along the optical axis direction, and the height perpendicular to the optical axis is h.

$$X = \frac{h^2/R}{1 + \sqrt{1 - (1+K)h^2/R^2}} + \sum A_i h^i \tag{8}$$

Where, $A_i$ is i-th order of aspheric surface coefficient,

R is a curvature radius,

K is a conical coefficient.

Further, exponent of 10 (for example, $2.5 \times 10^{-02}$) is expressed by using E (for example, 2.5E–02) in the following description (including the lens data in tables). Further, the surface number of the lens data is affixed in the order in such a manner that the object side of the first lens is made the first surface.

Example 1

Lens data of image pickup lens in Example 1 are shown in the following Table 1 and Table 2.

TABLE 1

Example 1
f = 2.83 mm fB = 0.18 mm F = 2.88 2Y = 3.50 mm

| Surface No. | R (mm) | D (mm) | Nd | vd |
|---|---|---|---|---|
| Diaphragm | ∞ | −0.07 | | |
| 1 | 0.914 | 0.65 | 1.58913 | 61.2 |
| 2 | 1.530 | 0.26 | | |
| 3 | 47.235 | 0.50 | 1.80518 | 25.4 |
| 4 | 2.897 | 0.25 | | |
| 5 | 1.343 | 0.80 | 1.58913 | 61.2 |
| 6 | 1.934 | 0.30 | | |
| 7 | ∞ | 0.40 | 1.51633 | 64.1 |
| 8 | ∞ | | | |

TABLE 2

Aspheric surface coefficient

1st surface

K = −6.60530E+00
A4 = 1.10650E+00
A6 = −2.77790E+00
A8 = 9.53820E+00
A10 = −2.05830E+01
A12 = 2.10530E+01

2nd surface

K = 6.39430E+00
A4 = −1.20600E−01
A6 = 8.87100E−01
A8 = −7.23170E+00
A10 = 2.69980E+01
A12 = −4.82990E+01

3rd surface

K = 3.00000E+01
A4 = −3.85660E−01
A6 = 7.86520E−01
A8 = −1.54530E+00
A10 = −1.44920E+00
A12 = 1.06300E+00

4th surface

K = −2.49840E+01
A4 = −5.33090E−01
A6 = 1.49210E+00
A8 = −2.33450E+00
A10 = 1.97480E+00
A12 = −7.13160E−01

5th surface

K = −1.19710E+01
A4 = −2.48910E−01
A6 = 1.46480E−01
A8 = −1.29470E−02
A10 = −1.10460E−02
A12 = 2.28710E−03

6th surface

K = −1.83550E+01
A4 = −8.57430E−02
A6 = −2.45010E−02
A8 = 1.65430E−02
A10 = −5.47400E−03
A12 = 9.05110E−04

Figure 5:
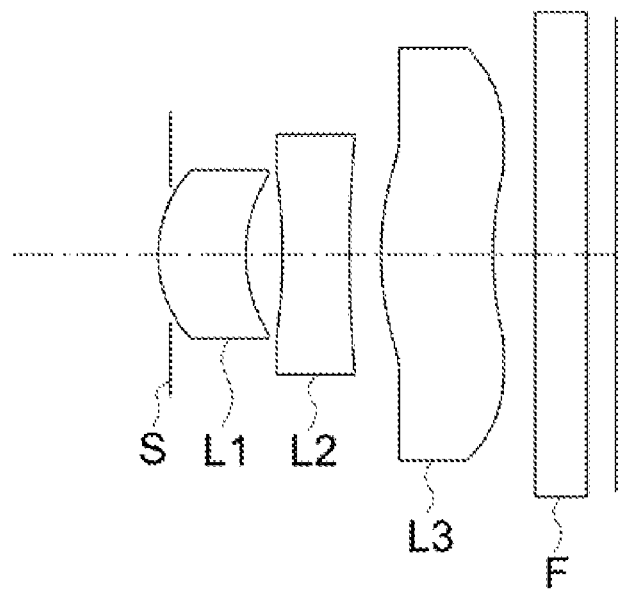
FIG. 5 is a sectional view of an image pickup lens shown in Example 1.

FIG. 5 is a sectional view of an image pickup lens shown in Example 1. In FIG. 5, there are the first lens L1, the second lens L2, the third lens L3 and an aperture stop S. Further, there is a parallel flat plate F provided as an element such as an optical low-pass filter, an infrared blocking filter and seal glass of solid-state image pickup element. In the Example 1, each of the first lens-third lens is a glass mold lens.

Figure 6:
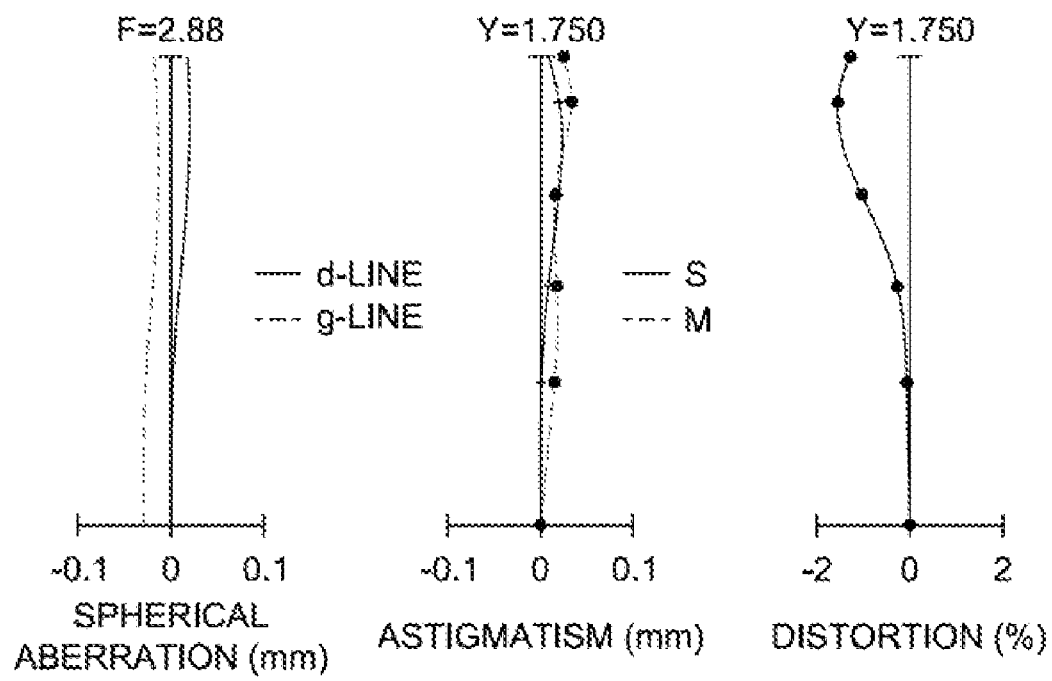
FIG. 6 shows aberration diagrams (spherical aberration, astigmatism, distortion and meridional coma) of an image pickup lens shown in Example 1.
Figure 6:
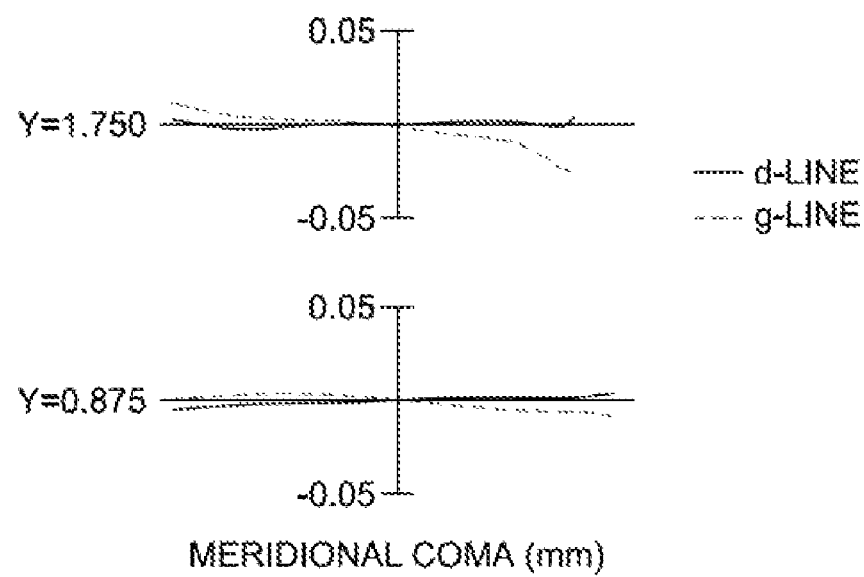

FIG. 6 shows aberration diagrams (spherical aberration, astigmatism and distortion) of the image pickup lens shown in Example 1.

Example 2

Lens data of image pickup lens in Example 2 are shown in the following Table 3 and Table 4.

TABLE 3

Example 2
f = 2.82 mm fB = 0.18 mm F = 2.88 2Y = 3.50 mm

| Surface No. | R (mm) | D (mm) | Nd | νd |
|---|---|---|---|---|
| Diaphragm | ∞ | −0.14 | | |
| 1 | 0.912 | 0.57 | 1.58913 | 61.2 |
| 2 | 1.342 | 0.40 | | |
| 3 | 4.796 | 0.50 | 1.58913 | 61.2 |
| 4 | 2.251 | 0.25 | | |
| 5 | 1.548 | 0.76 | 1.58913 | 61.2 |
| 6 | 2.087 | 0.28 | | |
| 7 | ∞ | 0.40 | 1.51633 | 64.1 |
| 8 | ∞ | | | |

TABLE 4

Aspheric surface coefficient

1st surface

K = −2.17120E+00
A4 = 3.53190E−01
A6 = 5.93090E−01
A8 = −3.87650E+00
A10 = 1.60280E+01
A12 = −2.36020E+01

2nd surface

K = 1.90310E+00
A4 = 1.37950E−01
A6 = 1.02570E+00
A8 = −8.21720E+00
A10 = 4.51390E+01
A12 = −6.87860E+01

3rd surface

K = −1.30640E+01
A4 = −2.14020E−01
A6 = 4.21960E−01
A8 = −1.10510E+00
A10 = 1.28480E+00
A12 = −4.03540E−01

4th surface

K = −3.00000E+01
A4 = −1.81320E−01
A6 = 3.34900E−01
A8 = −3.93120E−01
A10 = 2.34270E−01
A12 = −5.74510E−02

5th surface

K = −9.94060E+00
A4 = −1.83510E−01
A6 = 5.83560E−02
A8 = 2.61670E−02
A10 = −2.45900E−02
A12 = 4.83670E−03

6th surface

K = −1.12670E+01
A4 = −9.55740E−02
A6 = −7.69730E−03
A8 = 6.73280E−03
A10 = −2.65320E−04
A12 = −3.47090E−04

Figure 7:
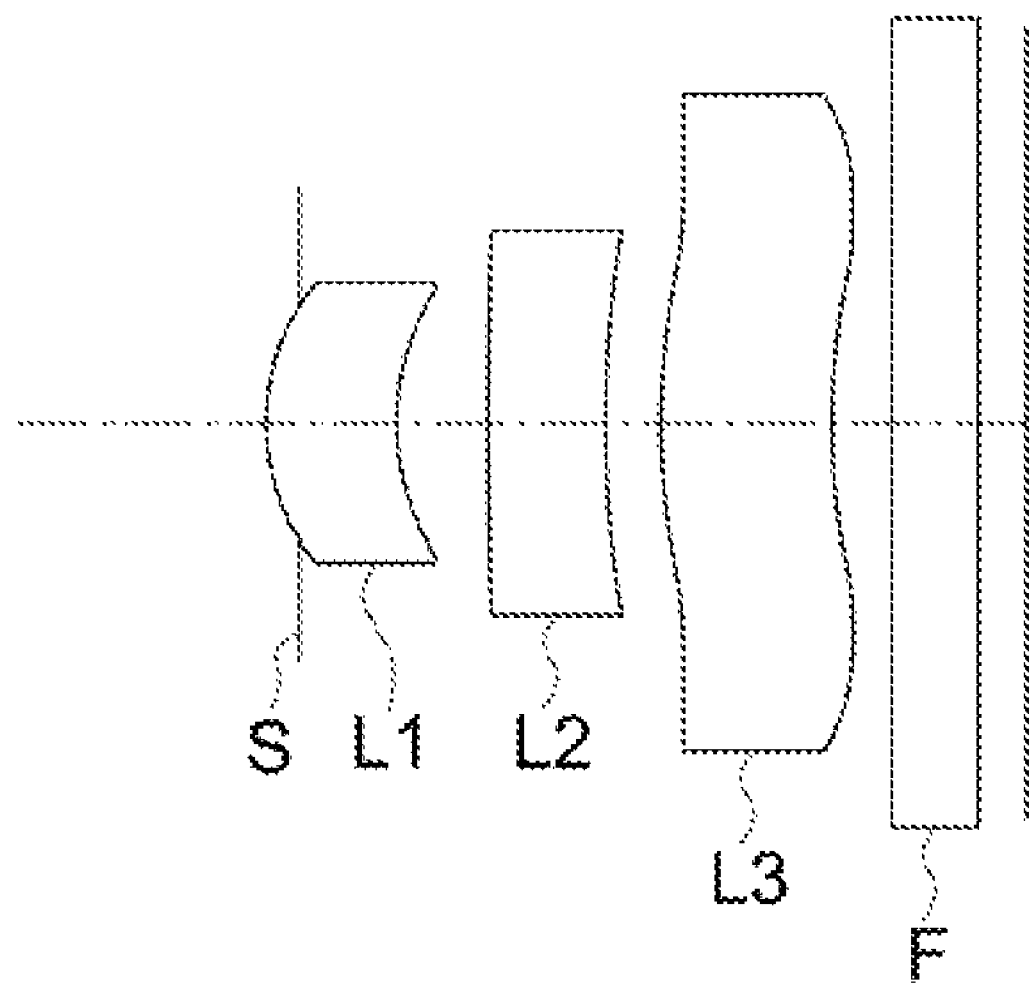
FIG. 7 is a sectional view of an image pickup lens shown in Example 2.

FIG. 7 is a sectional view of an image pickup lens shown in Example 2. In FIG. 7, there are the first lens L1, the second lens L2, the third lens L3 and an aperture stop S. Further, there is a parallel flat plate F provided as an element such as an optical low-pass filter, an infrared blocking filter and seal glass of solid-state image pickup element. In the Example 2, each of the first lens-third lens is a glass mold lens made of the same glass material.

Figure 8:
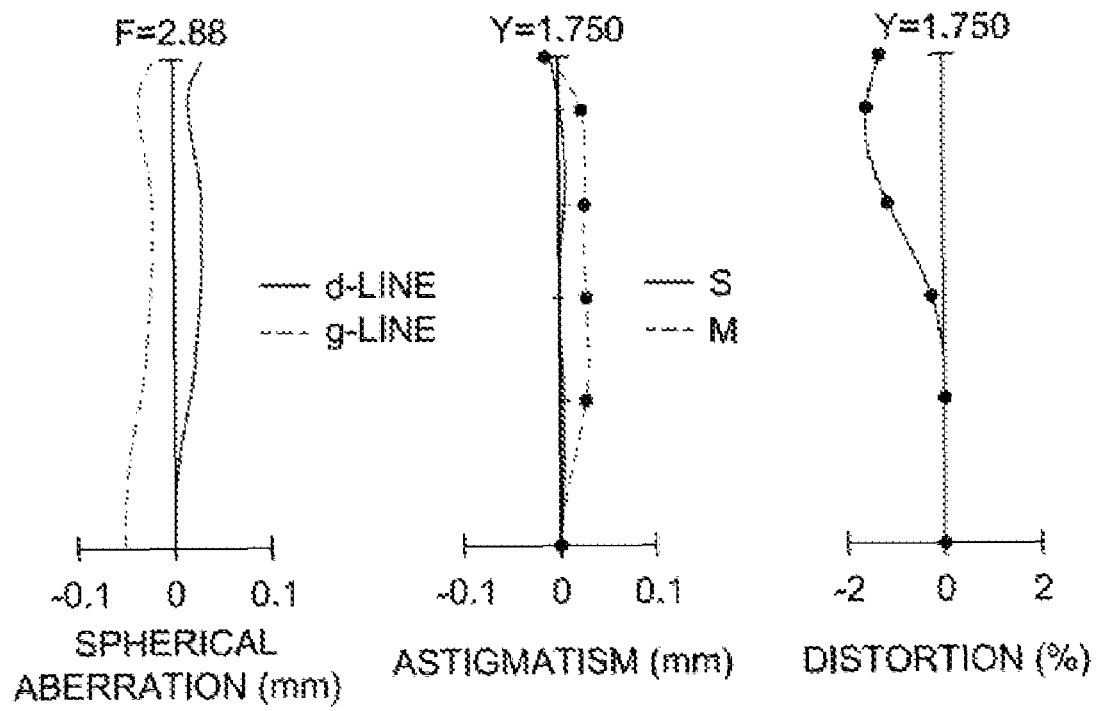
FIG. 8 shows aberration diagrams (spherical aberration, astigmatism, distortion and meridional coma) of an image pickup lens shown in Example 2.
Figure 8:
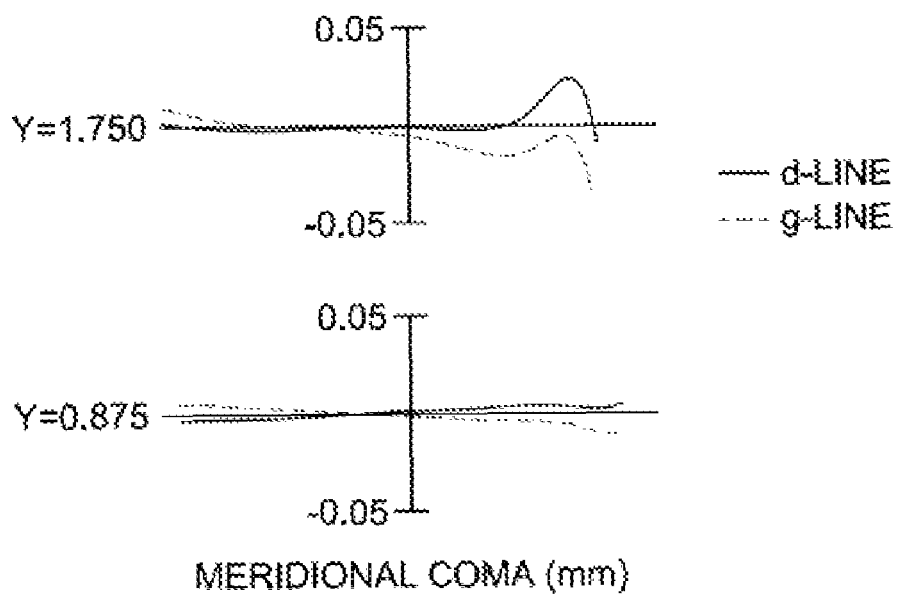

FIG. 8 shows aberration diagrams (spherical aberration, astigmatism and distortion) of the image pickup lens shown in Example 2.

As shown in the Example 1 and the Example 2 above, it is possible to create an image pickup lens having sufficient heat resistance, by making all of the first lens-third lens to be a lens made of glass material, which can be applied even to an occasion where soldering in the case of mounting an image pickup apparatus on another circuit base board is subjected to automatic mounting by using the reflow step.

Example 3

Lens data of image pickup lens in Example 3 are shown in the following Table 5 and Table 6.

TABLE 5

Example 3
f = 2.84 mm fB = 0.20 mm F = 2.88 2Y = 3.50 mm

| Surface No. | R (mm) | D (mm) | Nd | νd |
|---|---|---|---|---|
| Diaphragm | ∞ | −0.13 | | |
| 1 | 0.908 | 0.58 | 1.58913 | 61.2 |
| 2 | 1.364 | 0.36 | | |
| 3 | 6.860 | 0.51 | 1.58300 | 30.0 |
| 4 | 1.876 | 0.20 | | |
| 5 | 1.282 | 0.81 | 1.53180 | 56.0 |
| 6 | 2.407 | 0.30 | | |
| 7 | ∞ | 0.40 | 1.51633 | 64.1 |
| 8 | ∞ | | | |

TABLE 6

Aspheric surface coefficient

1st surface

K = −2.03170E+00
A4 = 3.48890E−01
A6 = 5.88410E−01
A8 = −4.47960E+00
A10 = 1.94930E+01
A12 = −2.84790E+01

2nd surface

K = 1.29070E+00
A4 = 7.80070E−02
A6 = 2.11620E+00
A8 = −1.52280E+01
A10 = 6.91220E+01
A12 = −9.62000E+01

3rd surface

K = 1.96240E+01
A4 = −3.75590E−01
A6 = 9.22590E−01
A8 = −2.91720E+00
A10 = 3.83010E+00
A12 = −1.28640E+00

4th surface

K = −3.00000E+01
A4 = −3.01910E−01

TABLE 6-continued

Aspheric surface coefficient

A6 = 6.59710E−01
A8 = −1.01700E+00
A10 = 7.80180E−01
A12 = −2.37880E−01

5th surface

K = −1.07020E+01
A4 = −1.97650E−01
A6 = 1.22110E−01
A8 = −4.89470E−02
A10 = −4.28350E−03
A12 = 3.74020E−03

6th surface

K = −2.18300E+01
A4 = −5.95470E−02
A6 = −3.51140E−02
A8 = 1.73820E−02
A10 = −1.90070E−03
A12 = −7.53190E−04

Figure 9:
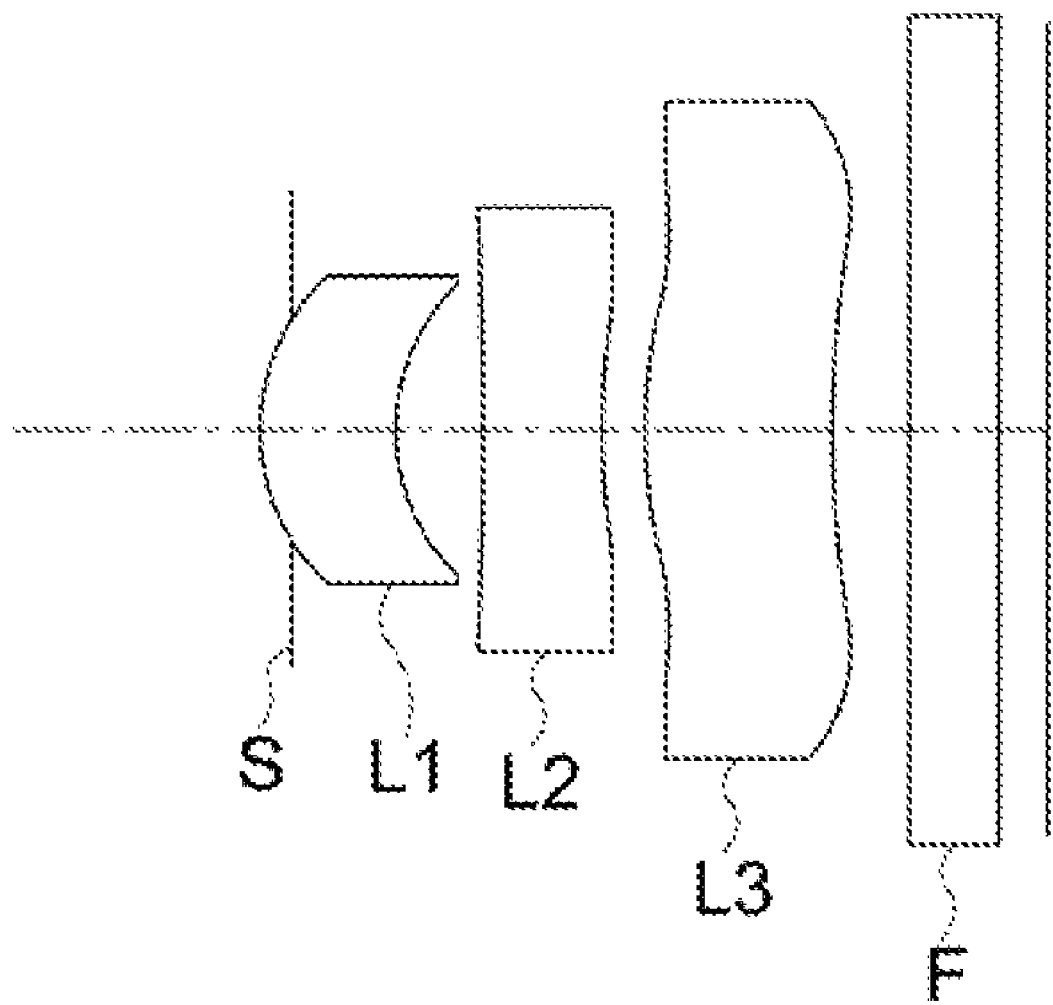
FIG. 9 is a sectional view of an image pickup lens shown in Example 3.

FIG. 9 is a sectional view of an image pickup lens shown in Example 3. In FIG. 9, there are first lens L1, second lens L2, third lens L3 and aperture stop S. Further, there is a parallel flat plate F provided as an element such optical low-pass filter, an infrared blocking filter and seal glass of solid-state image pickup element.

In the Example 3, the first lens is a glass mold lens. The second lens is made of polycarbonate-based plastic material, and its saturated water absorption is 0.4%. The third lens is made of polyolefin-based plastic material, and its saturated water absorption is 0.01% or less.

A plastic lens has greater saturated water absorption compared with a glass lens. Therefore, when humidity is changed rapidly, a plastic lens has a tendency that distribution of an amount of water absorption becomes transiently heterogeneous and refractive index is no uniform, and that an excellent image forming performance cannot be obtained. For controlling deterioration of performance caused by humidity changes, it is preferable to use plastic materials whose saturated water absorption is totally 0.7% or less.

Figure 10:
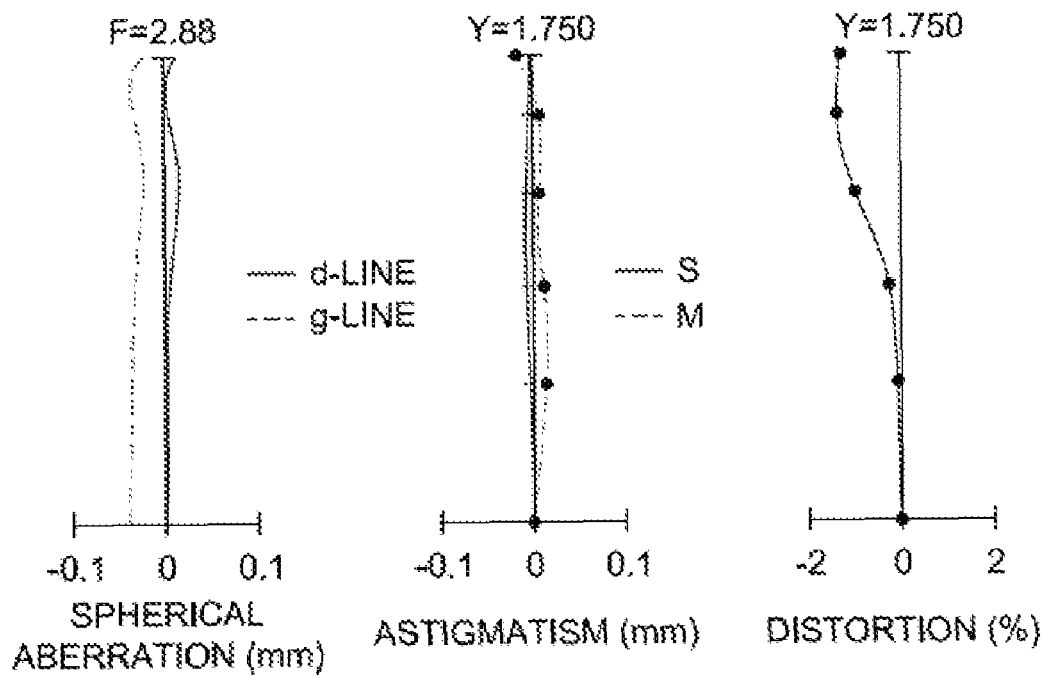
FIG. 10 shows aberration diagrams (spherical aberration, astigmatism, distortion and meridional coma) of an image pickup lens shown in Example 3.
Figure 10:
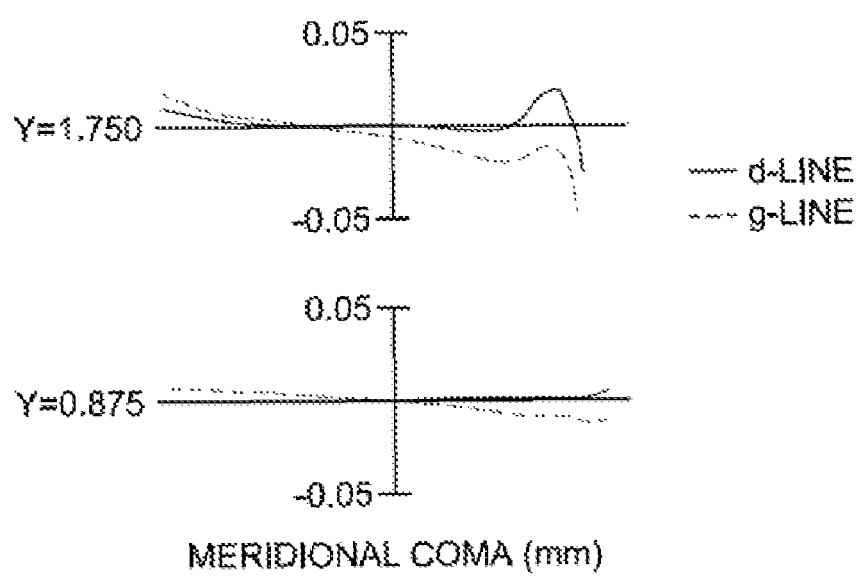

FIG. 10 shows aberration diagrams (spherical aberration, astigmatism and distortion) of the image pickup lens shown in Example 3.

Example 4

Lens data of image pickup lens in Example 4 are shown in the following Table 7 and Table 8.

TABLE 7

Example 4
f = 2.84 mm fB = 0.20 mm F = 2.88 2Y = 3.50 mm

| Surface No. | R (mm) | D (mm) | Nd | νd |
|---|---|---|---|---|
| Diaphragm | ∞ | −0.13 | | |
| 1 | 0.881 | 0.59 | 1.53180 | 56.0 |
| 2 | 1.492 | 0.36 | | |
| 3 | 7.302 | 0.50 | 1.58300 | 30.0 |
| 4 | 1.680 | 0.20 | | |
| 5 | 1.189 | 0.81 | 1.53180 | 56.0 |
| 6 | 2.207 | 0.30 | | |
| 7 | ∞ | 0.40 | 1.51633 | 64.1 |
| 8 | ∞ | | | |

TABLE 8

Aspheric surface coefficient

1st surface

K = −1.81790E+00
A4 = 3.34840E−01
A6 = 6.44280E−01
A8 = −4.39310E+00
A10 = 1.91610E+01
A12 = −2.81480E+01

2nd surface

K = 1.09450E+00
A4 = 1.50090E−01
A6 = 1.19350E+00
A8 = −6.97910E+00
A10 = 3.76060E+01
A12 = −5.02600E+01

3rd surface

K = 2.56340E+01
A4 = −4.29450E−01
A6 = 1.03530E+00
A8 = −3.10710E+00
A10 = 3.90210E+00
A12 = −1.28540E+00

4th surface

K = −3.00110E+01
A4 = −3.00450E−01
A6 = 5.86080E−01
A8 = −8.57780E−01
A10 = 6.43850E−01
A12 = −1.97680E−01

5th surface

K = −9.32810E+00
A4 = −2.28960E−01
A6 = 1.31450E−01
A8 = −4.59370E−02
A10 = −1.23990E−02
A12 = 5.53380E−03

6th surface

K = −1.37270E+01
A4 = −8.41770E−02
A6 = −2.12000E−02
A8 = 1.22020E−02
A10 = −9.74400E−04
A12 = −9.63730E−04

Figure 11:
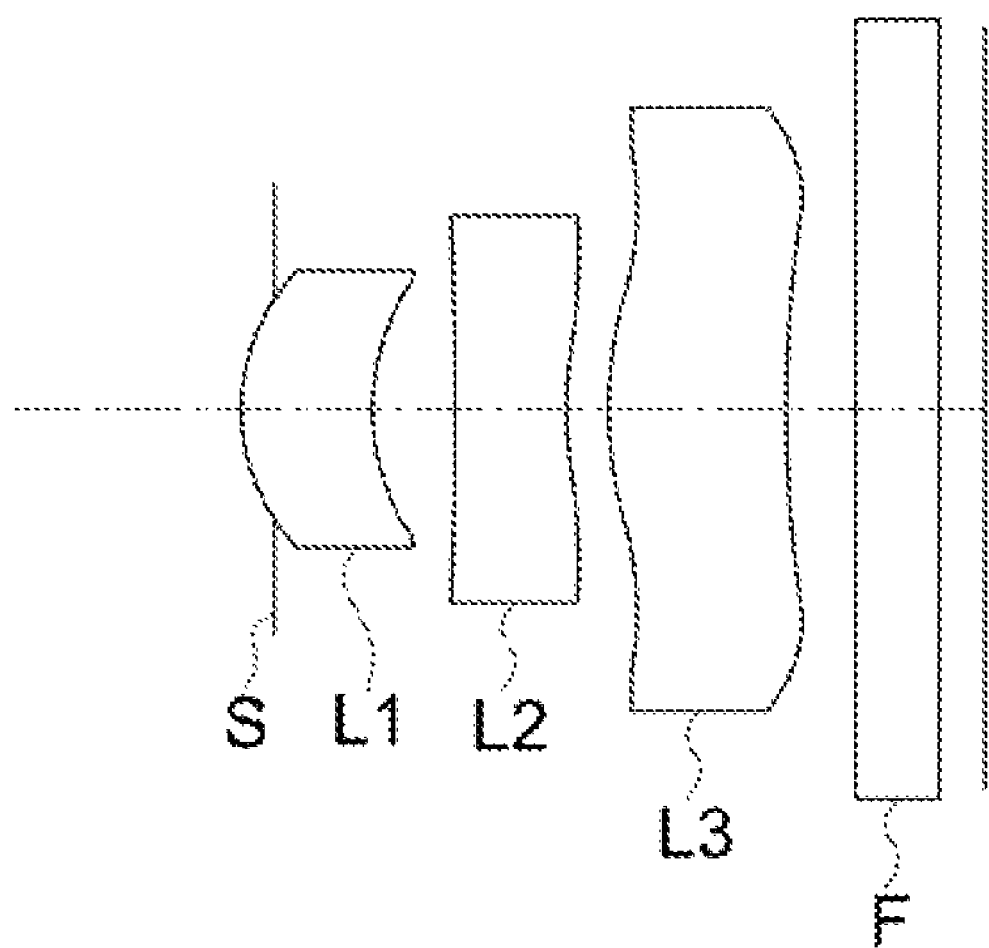
FIG. 11 is a sectional view of an image pickup lens shown in Example 4.

FIG. 11 is a sectional view of an image pickup lens shown in Example 4. In FIG. 11, there are first lens L1, second lens L2, third lens L3 and aperture stop S. Further, there is a parallel flat plate F provided as an element such as an optical low-pass filter, an infrared blocking filter and seal glass of solid-state image pickup element.

In the Example 4, the first lens and the third lens are made of polyolefin-based plastic materials, and saturated water absorption is 0.01% or less. The second lens is made of polycarbonate-based plastic material, and its saturated water absorption is 0.4%.

A plastic lens has greater saturated water absorption compared with a glass lens. Therefore, when humidity is changed rapidly, a plastic lens has a tendency that distribution of an amount of water absorption becomes transiently heterogeneous and refractive index is no uniform, and that an excellent image forming performance cannot be obtained. For controlling deterioration of performance caused by humidity changes, it is preferable to use plastic materials whose saturated water absorption is totally 0.7% or less.

Figure 12:
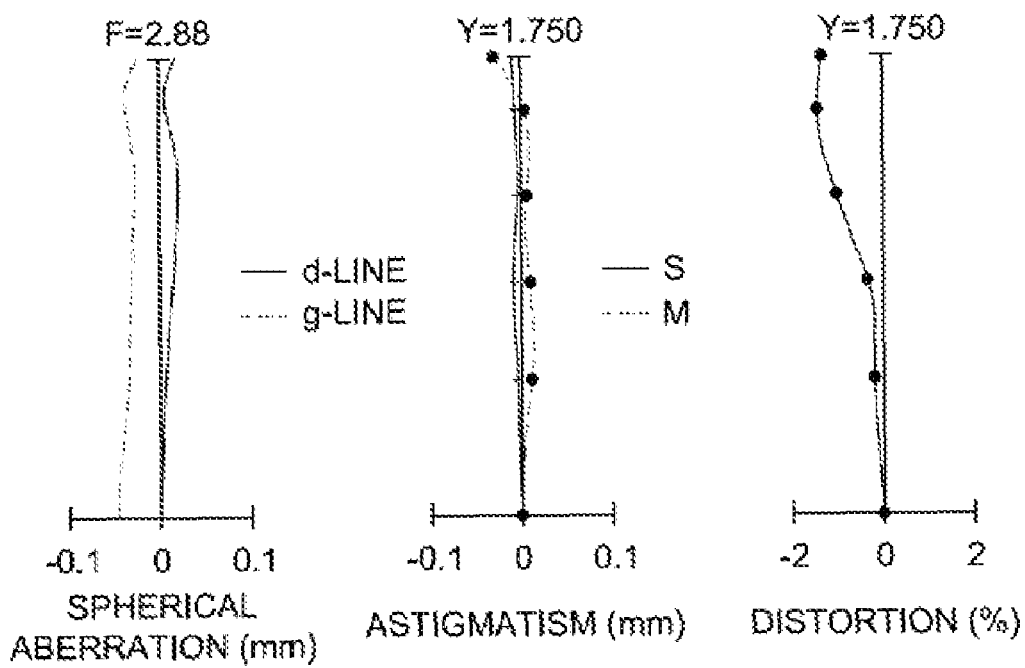
FIG. 12 shows aberration diagrams (spherical aberration, astigmatism, distortion and meridional coma) of an image pickup lens shown in Example 4.
Figure 12:
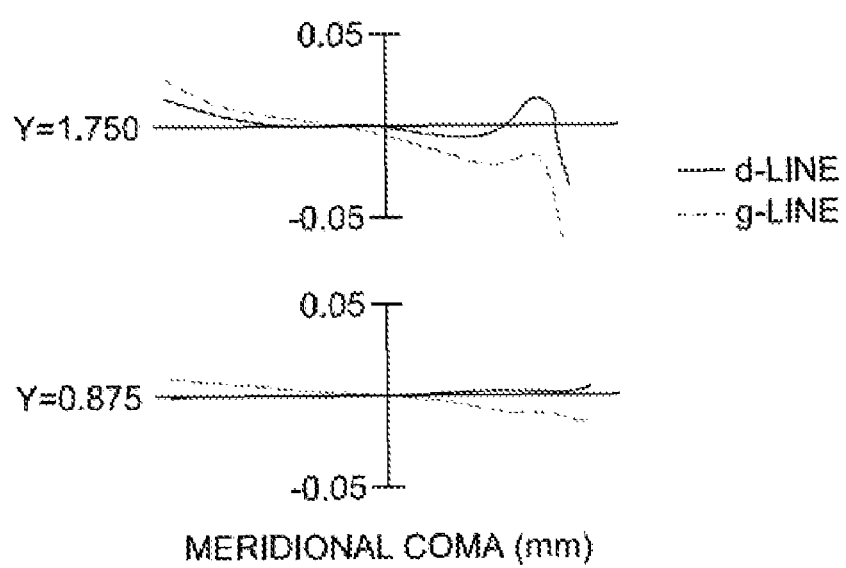

FIG. 12 shows aberration diagrams (spherical aberration, astigmatism and distortion) of the image pickup lens shown in Example 4.

Example 5

Lens data of image pickup lens in Example 5 are shown in the following Table 9 and Table 10.

TABLE 9

Example 5
f = 2.80 mm fB = 0.19 mm F = 2.88 2Y = 3.50 mm

| Surface No. | R (mm) | D (mm) | Nd | νd |
|---|---|---|---|---|
| Diaphragm | ∞ | −0.14 | | |
| 1 | 0.895 | 0.58 | 1.58913 | 61.2 |
| 2 | 1.408 | 0.44 | | |
| 3 | 8.464 | 0.51 | 1.80518 | 25.4 |
| 4 | 2.637 | 0.21 | | |
| 5 | 1.559 | 0.82 | 1.58913 | 61.2 |
| 6 | 2.377 | 0.22 | | |
| 7 | ∞ | 0.40 | 1.51633 | 64.1 |
| 8 | ∞ | | | |

TABLE 10

Aspheric surface coefficient

1st surface

K = −2.01630E+00
A4 = 3.44810E−01
A6 = 9.85330E−01
A8 = −7.35150E+00
A10 = 2.88700E+01
A12 = −4.00850E+01

2nd surface

K = 2.45280E+00
A4 = 1.56840E−01
A6 = 3.62500E−01
A8 = 1.99290E−01
A10 = 5.40140E+00
A12 = −2.18870E−01

3rd surface

K = −3.00000E+01
A4 = −2.28040E−01
A6 = 3.52690E−01
A8 = −9.66420E−01
A10 = 9.92630E−01
A12 = −2.38480E−01

4th surface

K = −7.01030E+00
A4 = −4.54040E−01
A6 = 8.49220E−01
A8 = −1.05620E+00
A10 = 7.21720E−01
A12 = −2.03210E−01

5th surface

K = −9.72830E+00
A4 = −2.84890E−01
A6 = 1.43830E−01
A8 = −8.88970E−03
A10 = −1.21190E−02
A12 = 2.39340E−03

6th surface

K = −1.61550E+00
A4 = −1.89360E−01
A6 = 4.33710E−02

TABLE 10-continued

Aspheric surface coefficient

A8 = −1.34560E−02
A10 = 4.53190E−03
A12 = −8.11270E−04

Figure 13:
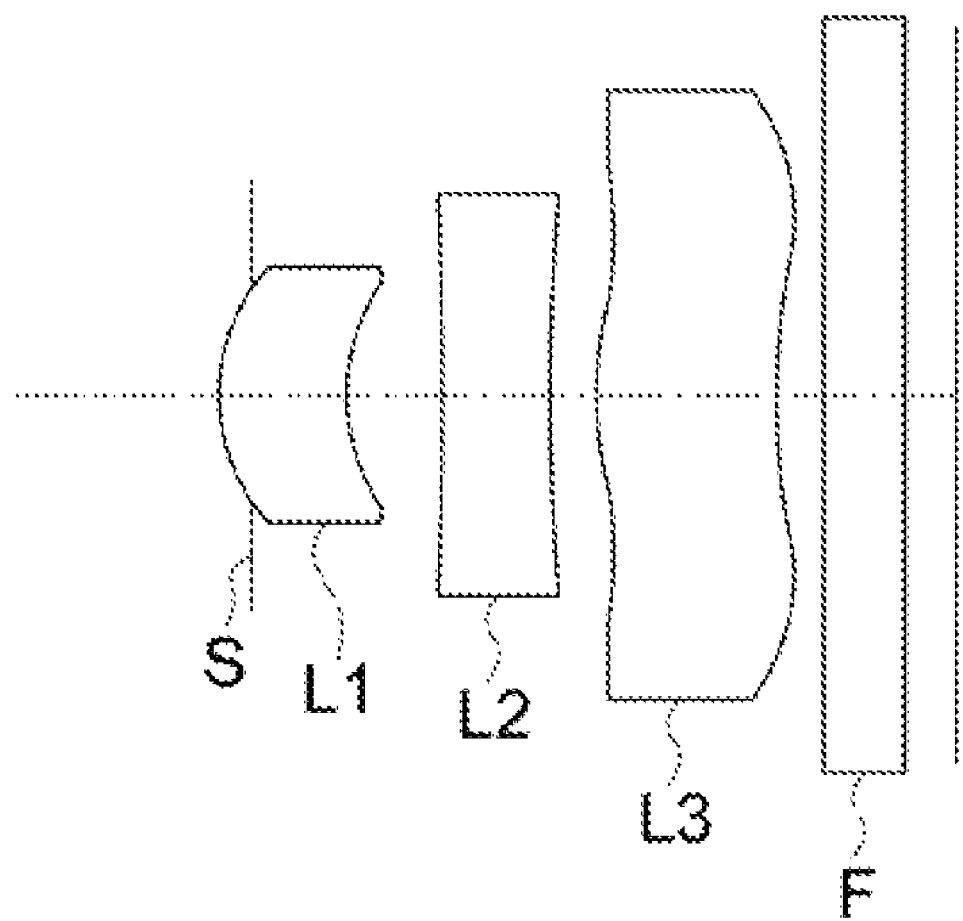
FIG. 13 is a sectional view of an image pickup lens shown in Example 5.

FIG. 13 is a sectional view of an image pickup lens shown in Example 5. In FIG. 13, there are first lens L1, second lens L2, third lens L3 and aperture stop S. Further, there is a parallel flat plate F provided as an element such as an optical low-pass filter, an infrared blocking filter and seal glass of solid-state image pickup element. In the Example 5, each of the first lens-the third lens is a glass mold lens.

Figure 14:
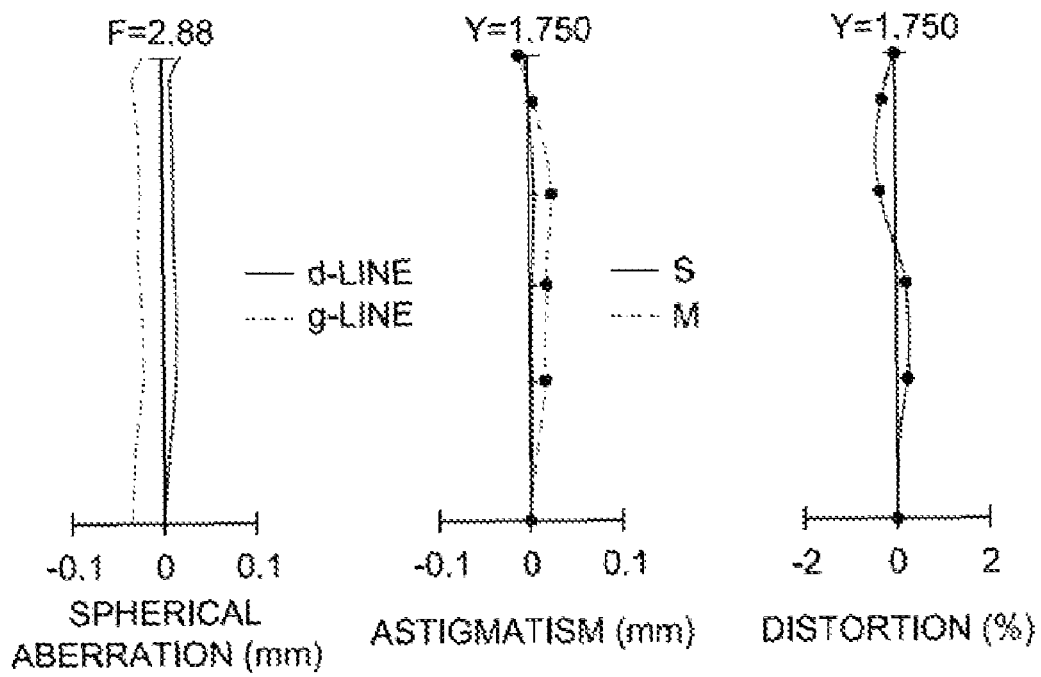
FIG. 14 shows aberration diagrams (spherical aberration, astigmatism, distortion and meridional coma) of an image pickup lens shown in Example 5.
Figure 14:
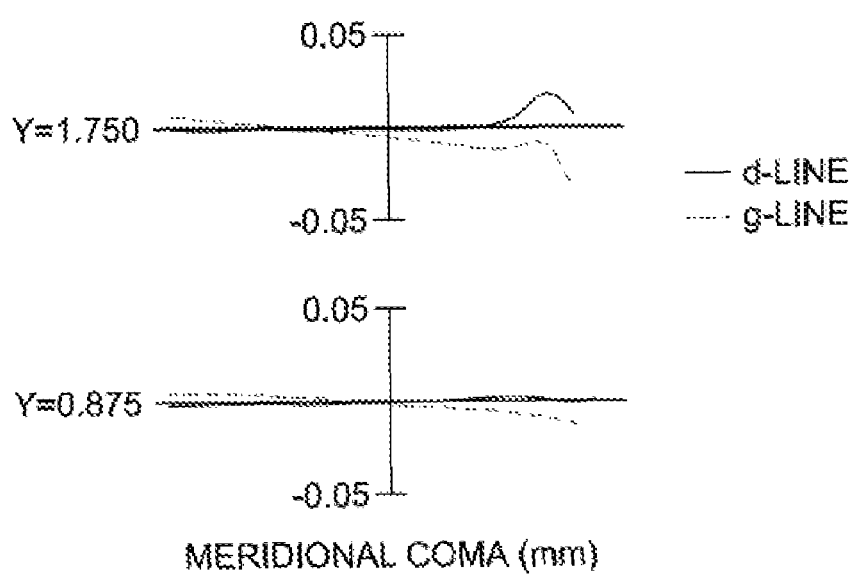

FIG. 14 shows aberration diagrams (spherical aberration, astigmatism and distortion) of the image pickup lens shown in Example 5.

Example 6

Lens data of image pickup lens in Example 6 are shown in the following Table 11 and Table 12.

TABLE 11

Example 6
f = 2.81 mm fB = 0.19 mm F = 2.88 2Y = 3.50 mm

| Surface No. | R (mm) | D (mm) | Nd | νd |
|---|---|---|---|---|
| Diaphragm | ∞ | −0.13 | | |
| 1 | 0.877 | 0.63 | 1.58913 | 61.2 |
| 2 | 1.530 | 0.28 | | |
| 3 | −8.589 | 0.51 | 1.80518 | 25.4 |
| 4 | 4.626 | 0.22 | | |
| 5 | 1.639 | 0.82 | 1.58913 | 61.2 |
| 6 | 2.894 | 0.30 | | |
| 7 | ∞ | 0.40 | 1.51633 | 64.1 |
| 8 | ∞ | | | |

TABLE 12

Aspheric surface coefficient

1st surface

K = −1.55610E+00
A4 = 2.94160E−01
A6 = 4.71120E−01
A8 = −1.579001E+00
A10 = 4.49910E+00
A12 = −2.84120E+00

2nd surface

K = 6.17320E+00
A4 = 8.16200E−03
A6 = −6.50490E−01
A8 = 7.40330E+00
A10 = −3.73490E+01
A12 = 7.18230E+01

3rd surface

K = 3.00000E+01
A4 = −2.74950E−01
A6 = −6.19040E−01
A8 = 4.26080E+00
A10 = −1.47970E+01
A12 = 9.36510E+00

TABLE 12-continued

Aspheric surface coefficient

4th surface

K = 9.32480E+00
A4 = −5.01680E−01
A6 = 8.82340E−01
A8 = −9.96330E−01
A10 = 5.68880E−01
A12 = −1.18010E−01

5th surface

K = −1.22860E+01
A4 = −2.55880E−01
A6 = 1.34820E−01
A8 = 1.33860E−02
A10 = −3.09460E−02
A12 = 9.33730E−03
A14 = −8.02680E−04

6th surface

K = −9.62240E+00
A4 = −1.29140E−01
A6 = 5.76180E−03
A8 = 9.86050E−03
A10 = −7.09530E−03
A12 = 2.04010E−03
A14 = −1.25540E−04

Figure 15:
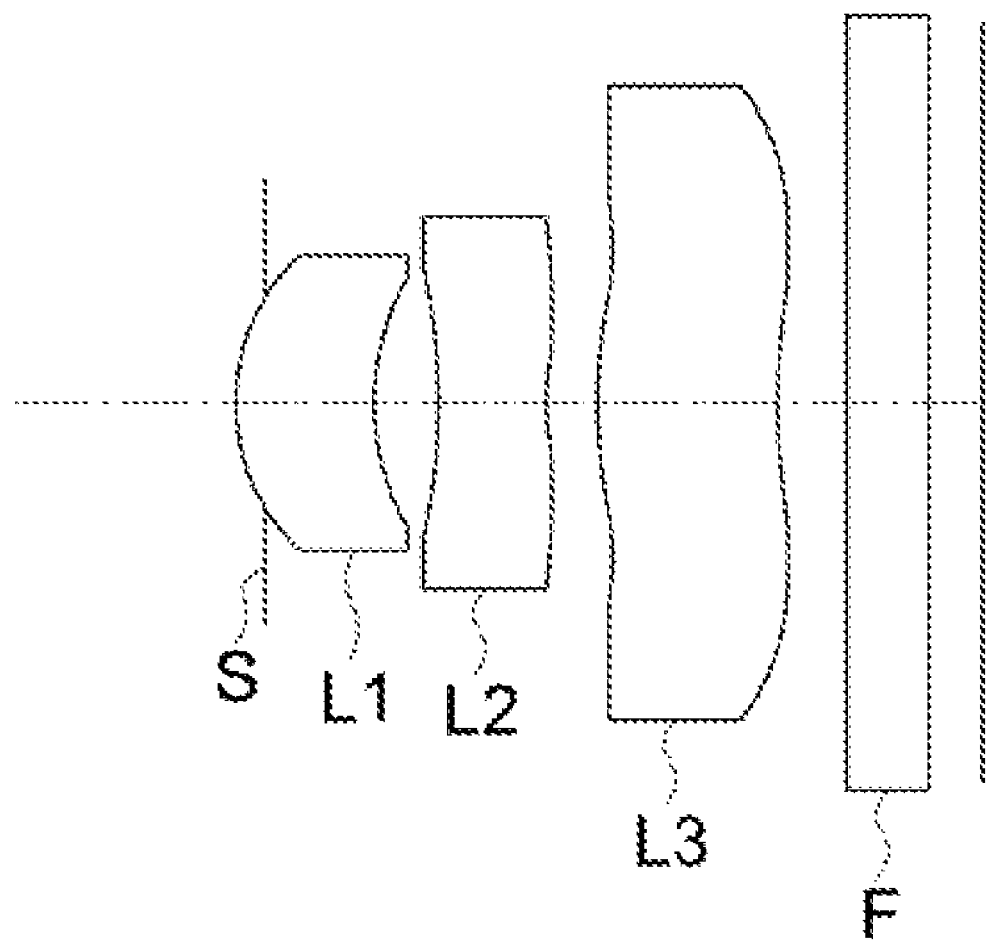
FIG. 15 is a sectional view of an image pickup lens shown in Example 6.

FIG. 15 is a sectional view of an image pickup lens shown in Example 6. In FIG. 15, there are first lens L1, second lens L2, third lens L3, and aperture stop S. Further, there is a parallel flat plate P provided as an element such as an optical low-pass filter, an infrared blocking filter and seal glass of solid-state image pickup element. In the Example 6, each of the first lens-the third lens is a glass mold lens.

Figure 16:
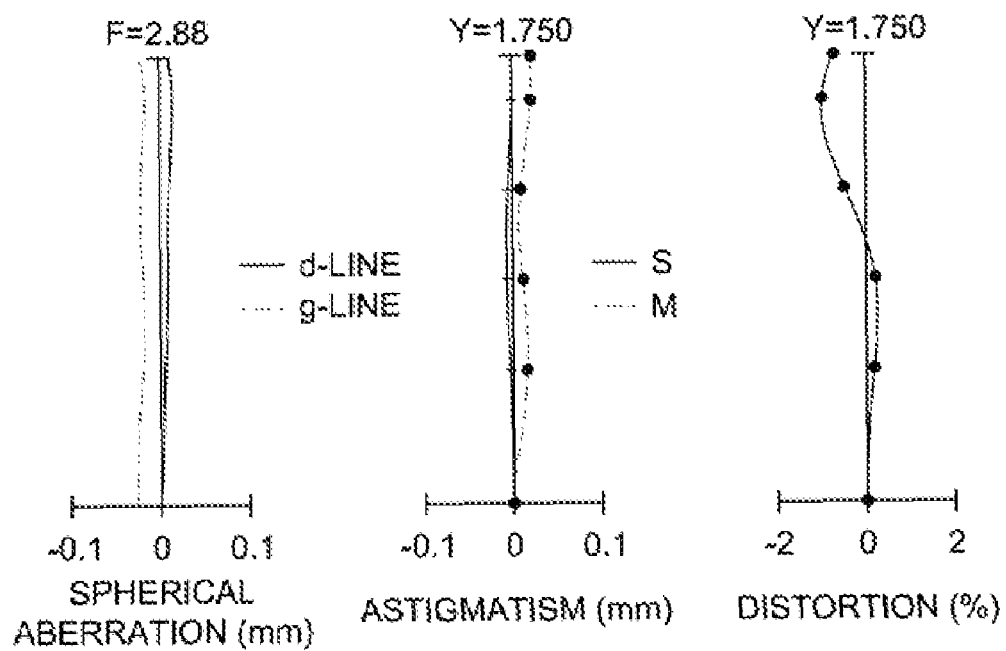
FIG. 16 shows aberration diagrams (spherical aberration, astigmatism, distortion and meridional coma) of an image pickup lens shown in Example 6.
Figure 16:
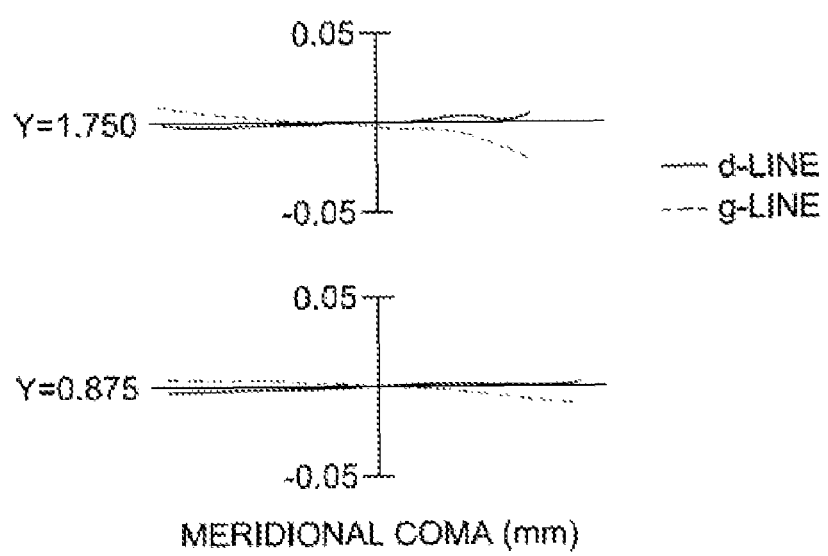

FIG. 16 shows aberration diagrams (spherical aberration, astigmatism and distortion) of the image pickup lens shown in Example 6.

Example 7

Lens data of image pickup lens in Example 7 are shown in the following Table 13 and Table 14.

TABLE 13

Example 7
f = 2.79 mm fB = 0.09 mm F = 2.88 2Y = 3.50 mm

| Surface No. | R (mm) | D (mm) | Nd | νd |
|---|---|---|---|---|
| Diaphragm | ∞ | −0.12 | | |
| 1 | 0.930 | 0.58 | 1.58913 | 61.2 |
| 2 | 1.456 | 0.51 | | |
| 3 | 11.508 | 0.65 | 1.58913 | 61.2 |
| 4 | 3.410 | 0.20 | | |
| 5 | 1.344 | 0.62 | 1.58913 | 61.2 |
| 6 | 1.449 | 0.28 | | |
| 7 | ∞ | 0.40 | 1.51633 | 64.1 |
| 8 | ∞ | | | |

TABLE 14

Aspheric surface coefficient

1st surface

K = −2.48350E+00
A4 = 3.67090E−01

TABLE 14-continued

Aspheric surface coefficient

A6 = 7.67800E-01
A8 = -4.80560E+00
A10 = 1.66430E+01
A12 = -2.16400E+01
2nd surface K = 1.55930E+00
A4 = 1.90200E-01
A6 = 1.12630E+00
A8 = -8.34140E+00
A10 = 4.14800E+01
A12 = -5.84890E+01
3rd surface K = 1.93720E+01
A4 = -1.20320E-01
A6 = 1.10320E-01
A8 = -5.90890E-01
A10 = 7.01450E-01
A12 = -1.75060E-01
4th surface K = -2.07300E+01
A4 = -2.95150E-01
A6 = 3.63890E-01
A8 = -4.19750E-01
A10 = 1.97810E-01
A12 = -3.27850E-02
5th surface K = -1.08140E+01
A4 = -9.47070E-02
A6 = -1.71830E-01
A8 = 1.21750E-01
A10 = -3.35320E-02
A12 = -1.96140E-02
A14 = 6.62230E-03
6th surface K = -1.04390E+01
A4 = -2.26060E-02
A6 = -7.96290E-02
A8 = 2.49790E-02
A10 = -3.84350E-03
A12 = 2.29930E-03
A14 = -7.53290E-04

Figure 17:
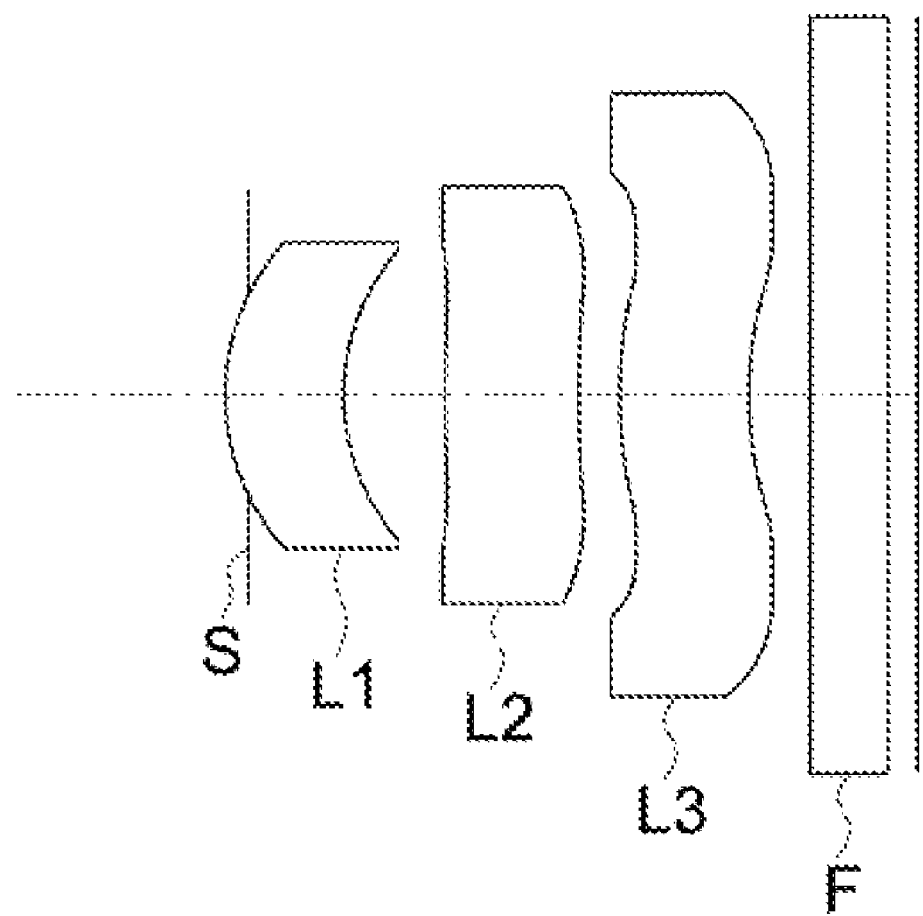
FIG. 17 is a sectional view of an image pickup lens shown in Example 7.

FIG. 17 is a sectional view of an image pickup lens shown in Example 7. In FIG. 17, there are first lens L1, second lens L2, third lens L3, and aperture stop S. Further, there is a parallel flat plate F provided as an element such as an optical low-pass filter, an infrared blocking filter and seal glass of solid-state image pickup element. In the Example 7, each of the first lens-third lens is a glass mold lens made of the same glass material.

Figure 18:
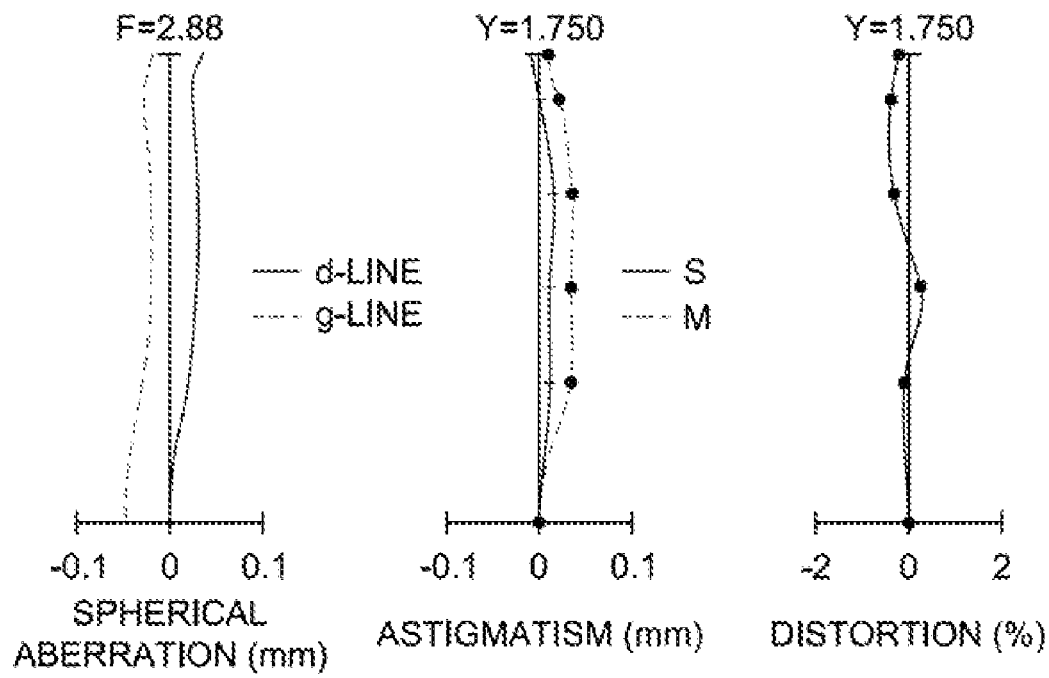
FIG. 18 shows aberration diagrams (spherical aberration, astigmatism, distortion and meridional coma) of an image pickup lens shown in Example 7.
Figure 18:
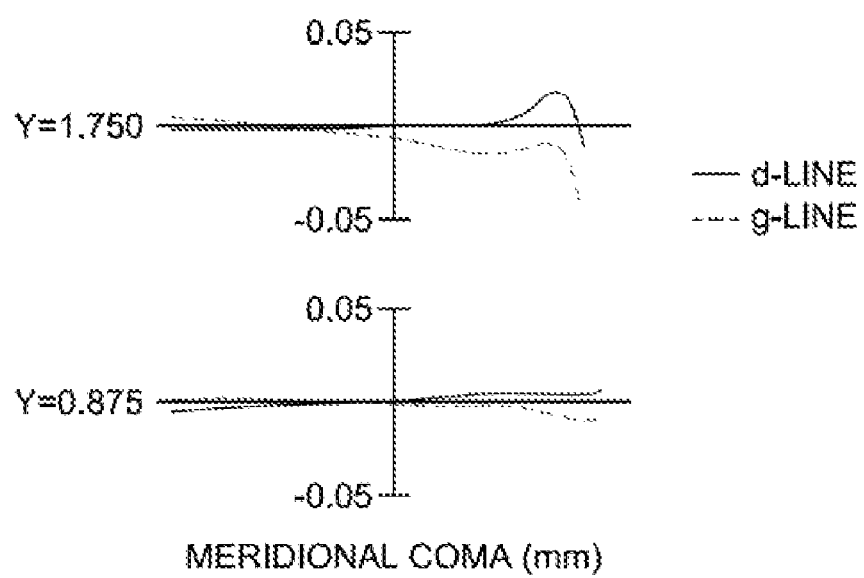

FIG. 18 shows aberration diagrams (spherical aberration, astigmatism and distortion) of the image pickup lens shown in Example 7.

Example 8

Lens data of image pickup lens in Example 8 are shown in the following Table 15 and Table 16.

TABLE 15

Example 8
f = 2.89 mm fB = 0.18 mm F = 2.88 2Y = 3.50 mm

| Surface No. | R (mm) | D (mm) | Nd | vd |
|---|---|---|---|---|
| Diaphragm | ∞ | -0.14 | | |
| 1 | 0.860 | 0.63 | 1.58913 | 61.2 |
| 2 | 1.540 | 0.30 | | |
| 3 | -7.130 | 0.51 | 1.80518 | 25.4 |
| 4 | 3.839 | 0.20 | | |
| 5 | 1.623 | 0.82 | 1.58913 | 61.2 |
| 6 | 2.862 | 0.30 | | |
| 7 | ∞ | 0.40 | 1.51633 | 64.1 |
| 8 | ∞ | | | |

TABLE 16

Aspheric surface coefficient

1st surface

K = -1.58320E+00
A4 = 3.12480E-01
A6 = 4.82480E-01
A8 = -1.33400E+00
A10 = 3.06240E+00
A12 = -2.25810E-01
2nd surface K = 6.75970E+00
A4 = 1.48160E-02
A6 = -7.84210E-01
A8 = 8.05550E+00
A10 = -3.93500E+01
A12 = 7.27280E+01
3rd surface K = 3.00000E+01
A4 = -3.08930E-01
A6 = -7.30040E-01
A8 = 4.88420E+00
A10 = -1.45990E+01
A12 = 3.63000E+00
4th surface K = 8.28480E+00
A4 = -5.91640E-01
A6 = 1.01090E+00
A8 = -1.04570E+00
A10 = 5.54470E-01
A12 = -1.40010E-01
5th surface K = -8.75430E+00
A4 = -3.94370E-01
A6 = 2.63910E-01
A8 = -5.44670E-03
A10 = -5.31160E-02
A12 = 1.43490E-02
A14 = -6.31860E-04
6th surface K = -1.43420E+01
A4 = -1.25730E-01
A6 = -2.03000E-02
A8 = 2.92770E-02
A10 = -1.12230E-02
A12 = 1.57080E-03
A14 = -4.02790E-05

Figure 19:
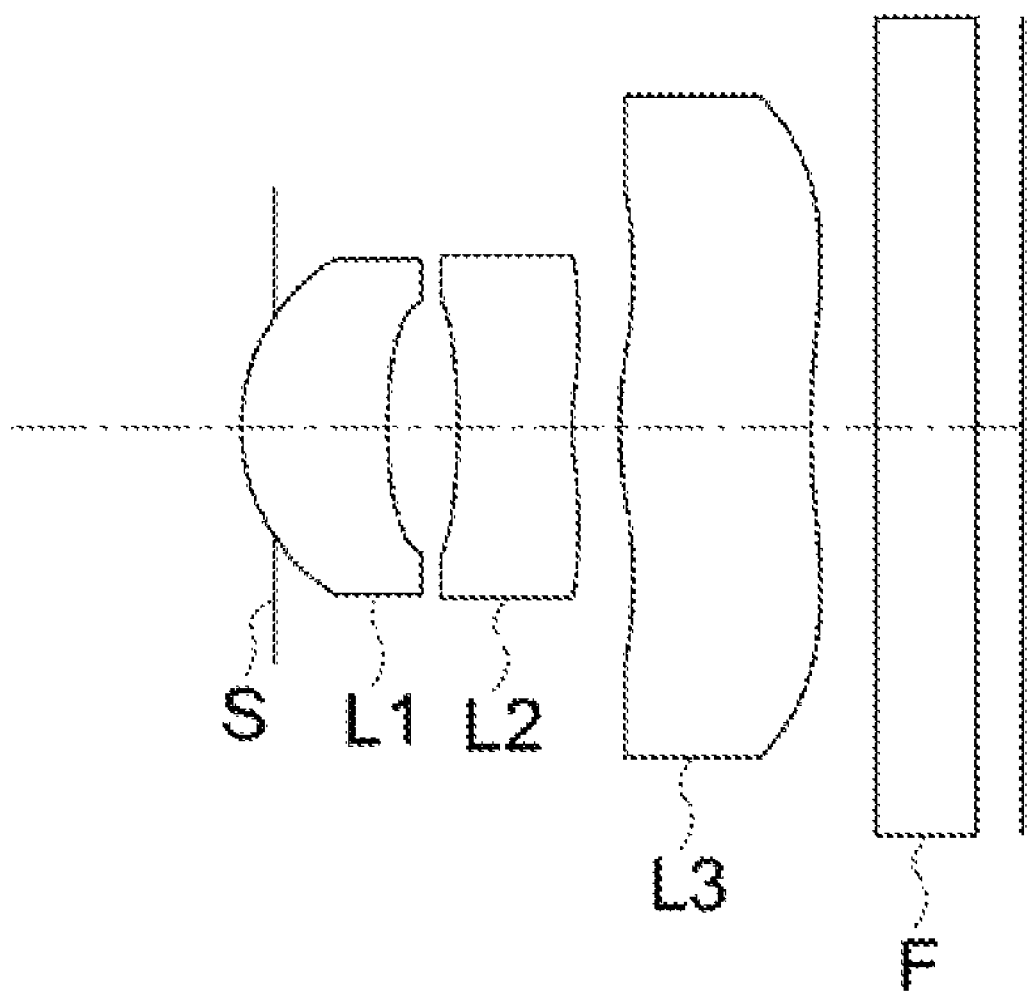
FIG. 19 is a sectional view of an image pickup lens shown in Example 8.

FIG. 19 is a sectional view of an image pickup lens shown in Example 8. In FIG. 19, there are first lens L1, second lens L2, third lens L3, and aperture stop S. Further, there is a parallel flat plate F provided as an element such as an optical low-pass filter, an infrared blocking filter and seal glass of solid-state image pickup element. In the Example 8, each of the first lens-the third lens is a glass mold lens.

Figure 20:
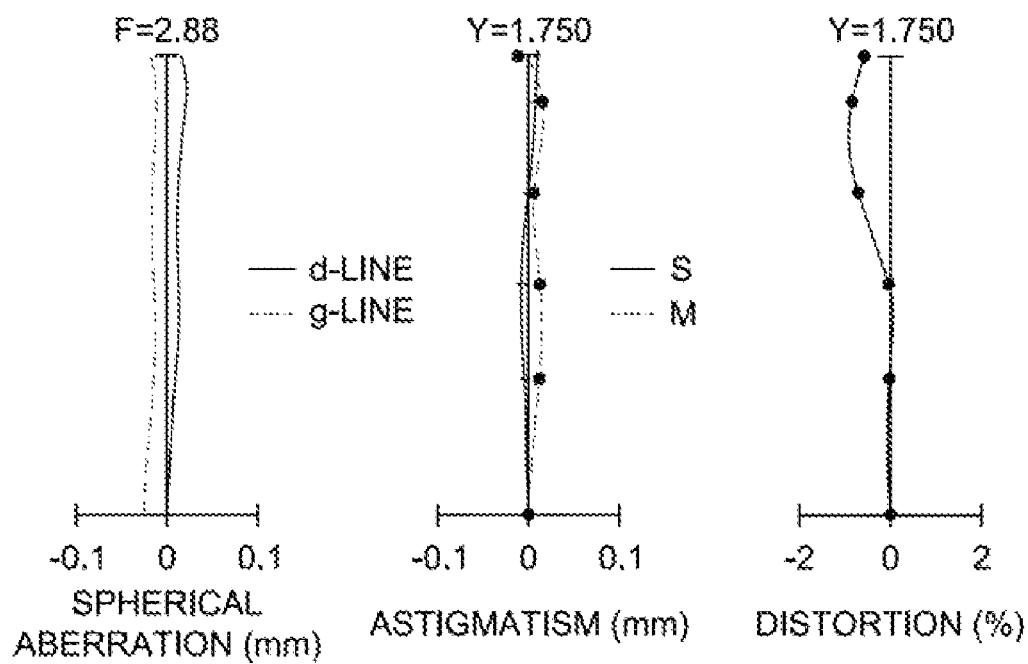
FIG. 20 shows aberration diagrams (spherical aberration, astigmatism, distortion and meridional coma) of an image pickup lens shown in Example 8.
Figure 20:
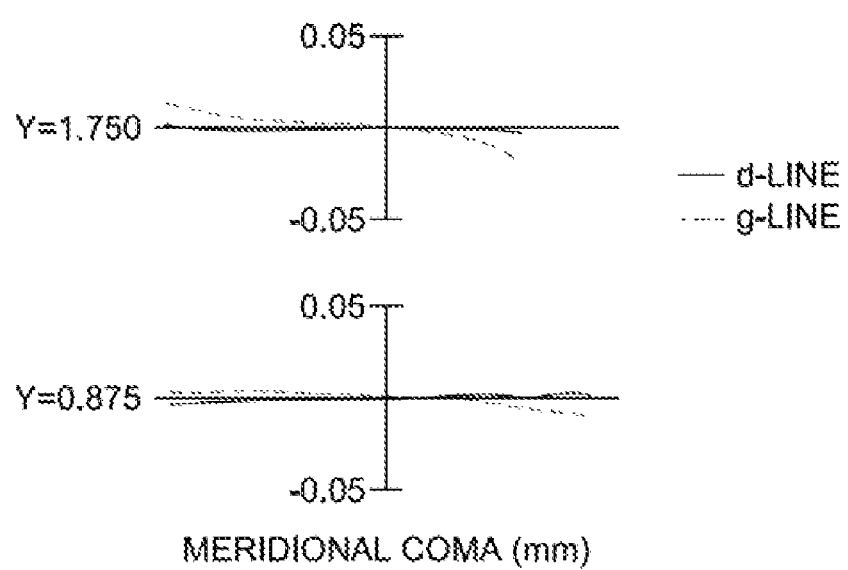

FIG. 20 shows aberration diagrams (spherical aberration, astigmatism and distortion) of the image pickup lens shown in Example 8.

As shown in the Examples 5-8 above, it is possible to create an image pickup lens having sufficient heat resistance, by making all of the first lens-third lens to be a lens made of glass material, which can be applied even to an occasion where soldering in the case of mounting an image pickup apparatus on another circuit base board is subjected to automatic mounting by using the reflow step.

Values corresponding to respective Examples 1-4 above are shown in Table 17, and values corresponding to respective Examples 5-8 are shown in Table 18. In Examples 1-8, the image pickup apparatus has a height of 10 mm or less in a direction of an optical axis of the image pickup lens.

TABLE 17

| | | Example 1 | Example 2 | Example 3 | Example 4 |
|---|---|---|---|---|---|
| (1) | Pair/P | 0.54 | 0.41 | 0.37 | 0.37 |
| (2) | f1/f | 0.98 | 1.15 | 1.10 | 1.07 |
| (3) | (R3 + R4)/(R3 − R4) | 1.13 | 2.77 | 1.75 | 1.60 |
| (4) | f3/f | 1.76 | 2.37 | 1.46 | 1.34 |
| (5) | ν1 − ν2 | 35.7 | 0.0 | 31.1 | 26.0 |
| (6) | L/f | 1.14 | 1.14 | 1.14 | 1.14 |

TABLE 18

| | | Example 5 | Example 6 | Example 7 | Example 8 |
|---|---|---|---|---|---|
| (1) | Pair/P | 0.27 | 0.57 | 0.78 | 0.24 |
| (2) | f1/f | 1.05 | 0.92 | 1.12 | 0.80 |
| (3) | (R3 + R4)/(R3 − R4) | 1.91 | 0.30 | 1.84 | 0.20 |
| (4) | f3/f | 2.01 | 1.86 | 3.56 | 3.76 |
| (5) | ν1 − ν2 | 35.7 | 35.7 | 0.0 | 35.7 |
| (6) | L/f | 1.16 | 1.15 | 1.16 | 1.09 |

Incidentally, with respect to an incident angle of principal ray for the light flux entering an image pickup plane of a solid-state image pickup element, the aforesaid Examples are not always designed sufficiently small on the peripheral portion of the image pickup plane. In the recent technology, however, it has become possible to reduce shading caused on the solid-state image pickup element by the review of arrangement of a color filter of the solid-state image pickup element and an on-chip micro-lens array. Specifically, if a pitch of the arrangement of a color filter and an on-chip micro-lens array is established to be slightly smaller than a pixel pitch on the image pickup surface of the image pickup element, the color filter and the on-chip micro-lens array are shifted more to the optical axis side of the image pickup lens for each pixel, as their positions approach closer to the peripheral portion of the image pickup surface. Thus, it is possible to guide an oblique incidence light flux to a light-receiving section of each pixel effectively. Owing to this, shading caused on the solid-state image pickup element can be controlled to be small. Therefore, in the aforesaid examples, the aforesaid requirement about the incident angle of the principal ray on the peripheral portion of the image pickup plane becomes smaller, and the examples can be designed with aiming further downsizing of the image pickup apparatus.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image pickup lens for forming an image of an object on a photoelectrical converter of a solid-state image pickup element, the image pickup lens comprising, in order from an object side thereof:

an aperture stop;

a first lens having a positive refractive power and having a meniscus shape whose surface facing the object side is convex;

a second lens having a negative refractive power whose surface facing an image side of the image pickup lens is concave; and a third lens having a positive refractive power and having a meniscus shape whose surface facing the object side is convex, wherein each of the first lens, the second lens, and the third lens comprises an aspheric optical surface, and the image pickup lens satisfies following expressions:

$0 < Pair/P < 1.0$ $0.7 < f1/f < 1.25$ where f is a focal length of the total system of the image pickup lens, f1 is a focal length of the first lens, P is a refractive power of a total system of the image pickup lens, and Pair is a refractive power of an air lens which is formed from the surface of the second lens facing the image side and the surface of the third lens facing the object side, and which is defined by a following expression:

$$Pair = \frac{1-n2}{R4} + \frac{n3-1}{R5} - D23 \cdot \frac{(1-n2) \cdot (n3-1)}{R4 \cdot R5},$$

where n2 is a refractive index of the second lens for d line, n3 is a refractive index of the third lens for d line, R4 is a curvature radius of the surface of the second lens facing the image side, R5 is a curvature radius of the surface of the third lens facing the object side, and D23 is a length of an air space between the second lens and the third lens along an optical axis of the image pickup lens.

2. The image pickup lens of claim 1, satisfying a following expression:

$0 < (R3+R4)/(R3-R4) < 3.0$ where R3 is a curvature radius of a surface of the second lens facing the object side, and R4 is a curvature radius of the surface of the second lens facing the image side.

3. The image pickup lens of claim 1, satisfying a following expression:

$1.3 < f3/f < 4.0$ where f3 is a focal length of the third lens and
f is a focal length of the total system of the image pickup lens.

4. The image pickup lens of claim 1, satisfying a following expression:

$$20 < v1 - v2 < 65$$

where v1 is an Abbe number of the first lens, and
v2 is an Abbe number of the second lens.

5. The image pickup lens of claim 1,
wherein each of the first lens, the second lens, and the third lens comprises a glass material.

6. An image pickup apparatus comprising:
a solid-state image pickup element;
the image pickup lens of claim 1; and
a casing comprising a light-shielding material, comprising an opening for an incident light flux from an object side of the image pickup lens, and housing the image pickup lens therein,
wherein the solid-state image pickup element, the image pickup lens, and the casing are formed in one body, and
the image pickup apparatus has a height of 10 mm or less in a direction of an optical axis of the image pickup lens.

7. A mobile terminal comprising the image pickup apparatus of claim 6.

* * * * *